US010730336B2

(12) United States Patent
Dietemann

(10) Patent No.: US 10,730,336 B2
(45) Date of Patent: Aug. 4, 2020

(54) SECURE ITEM COMPRISING A COMBINED IMAGE AND/OR A REVEALING SCREEN

(71) Applicant: OBERTHUR FIDUCIAIRE SAS, Paris (FR)

(72) Inventor: Philippe Dietemann, Saint Martin D'heres (FR)

(73) Assignee: OBERTHUR FIDUCIARIE SAS, Paris (FR)

( * ) Notice: Subject to any disclaimer, the term of this patent is extended or adjusted under 35 U.S.C. 154(b) by 147 days.

(21) Appl. No.: 16/066,185

(22) PCT Filed: Dec. 23, 2016

(86) PCT No.: PCT/EP2016/082648
§ 371 (c)(1),
(2) Date: Jun. 26, 2018

(87) PCT Pub. No.: WO2017/114801
PCT Pub. Date: Jul. 6, 2017

(65) Prior Publication Data

US 2019/0009609 A1 Jan. 10, 2019

(30) Foreign Application Priority Data

Dec. 29, 2015 (FR) ..................................... 15 63425

(51) Int. Cl.
*B42D 25/342* (2014.01)
*B42D 25/351* (2014.01)
(Continued)

(52) U.S. Cl.
CPC ......... *B42D 25/342* (2014.10); *B42D 25/305* (2014.10); *B42D 25/351* (2014.10);
(Continued)

(58) Field of Classification Search
CPC .. B42D 25/342; B42D 25/305; B42D 25/378; B42D 25/373; B42D 25/351;
(Continued)

(56) References Cited

U.S. PATENT DOCUMENTS 2,021,141 A 11/1935 Boyer
5,118,526 A 6/1992 Allen et al.
(Continued)

FOREIGN PATENT DOCUMENTS

CA 2471379 A1 7/2003
EP 0203499 A2 12/1986
(Continued)

OTHER PUBLICATIONS

Corresponding International Application, International Search Report; Application No. PCT/EP2016/082648, dated Mar. 2. 2017, 4 pages.
(Continued)

*Primary Examiner* — Juan A Torres
(74) *Attorney, Agent, or Firm* — Cooper Legal Group, LLC; Ronald M. Kachmarik

(57) ABSTRACT

A secure item including a first optical structure and a second optical structure, or an assembly comprising a secure item and another object. The first optical structure including a plurality of blocks and being one of a revealing screen and a combined image. The second optical structure being the other one. Each of the combined image blocks being made up of a plurality of interlaced images. The combined image or each combined image block including a periodic alternation of interlaced image elements. The elements of the interlaced images of a single interlaced image being the same color, but a different color from that of the other interlaced images. At least two blocks of the first optical structure each allowing the observation of a revealed image
(Continued)

in each block of a first optical structure, showing different proportions of the interlaced images.

26 Claims, 17 Drawing Sheets

(51) Int. Cl.

| | |
|---|---|
| ***B42D 25/305*** | (2014.01) |
| ***G07D 7/207*** | (2016.01) |
| ***G07D 7/00*** | (2016.01) |
| ***B42D 25/373*** | (2014.01) |
| ***B42D 25/378*** | (2014.01) |
| ***G06K 9/32*** | (2006.01) |
| ***G06K 9/82*** | (2006.01) |
| *B42D 25/328* | (2014.01) |
| *B42D 25/355* | (2014.01) |
| *B42D 25/364* | (2014.01) |

(52) U.S. Cl.
CPC ......... *B42D 25/373* (2014.10); *B42D 25/378* (2014.10); *G06K 9/3208* (2013.01); *G06K 9/82* (2013.01); *G07D 7/003* (2017.05); *G07D 7/207* (2017.05); *B42D 25/328* (2014.10); *B42D 25/355* (2014.10); *B42D 25/364* (2014.10)

(58) Field of Classification Search
CPC .. B42D 25/364; B42D 25/355; B42D 25/328; G07D 7/003; G07D 7/207; G06K 9/82; G06K 9/3208
USPC .......................................................... 382/135
See application file for complete search history.

(56) References Cited

U.S. PATENT DOCUMENTS

| | | | | |
|---|---|---|---|---|
| 2005/0183300 A1* | 8/2005 | Seder | G09F 11/00 | 40/421 |
| 2005/0184504 A1* | 8/2005 | Alasia | B42D 25/29 | 283/72 |
| 2006/0003295 A1* | 1/2006 | Hersch | B42D 25/342 | 434/110 |
| 2006/0280331 A1* | 12/2006 | Chosson | G07D 7/20 | 382/100 |
| 2012/0001411 A1* | 1/2012 | Rosset | B42D 25/387 | 283/70 |
| 2012/0025514 A1* | 2/2012 | Camus | B42D 25/435 | 283/67 |
| 2012/0174447 A1* | 7/2012 | Vincent | B42D 25/355 | 40/453 |
| 2012/0182443 A1* | 7/2012 | Vincent | B42D 25/351 | 348/222.1 |
| 2012/0189159 A1* | 7/2012 | Vincent | B42D 25/351 | 382/100 |
| 2013/0169677 A1* | 7/2013 | Rosset | B41M 3/148 | 345/629 |

FOREIGN PATENT DOCUMENTS

| | | | |
|---|---|---|---|
| EP | 0229645 | A1 | 7/1987 |
| EP | 1252389 | A1 | 10/2002 |
| EP | 2367695 | A2 | 9/2011 |
| EP | 2585308 | A1 | 5/2013 |
| EP | 2740607 | A1 | 6/2014 |
| FR | 2961621 | A1 | 12/2011 |
| GB | 1552853 | | 9/1979 |
| WO | 2004096482 | A1 | 11/2004 |
| WO | 2008006983 | A1 | 1/2008 |
| WO | 2011007344 | A1 | 1/2011 |
| WO | 2014096794 | A1 | 6/2014 |

OTHER PUBLICATIONS

Rudolf L. van Rene sse: "Optical Document Security (Third Edition)" 2005, Artech House, Boston/London XP002756960, ISBN: 1-58053-258-6, p. 147,153.

* cited by examiner

SECURE ITEM COMPRISING A COMBINED IMAGE AND/OR A REVEALING SCREEN

The present invention pertains to the field of secure items.

BACKGROUND

In order to guard against forgeries or falsifications and in order to increase the security level, it is known to use security elements applied on the surface or introduced bulk-wise or as window(s) into a secure item, for example a label, a packaging, especially for medicines, foods, cosmetics, electronic parts or spare parts.

The secure item may in particular be chosen from among a payment means, such as a banknote, a bank card, a check or a restaurant voucher, an identity document such as an identity card, a visa, a passport or a driver's license, a secure card, a lottery ticket, a transport pass or else an entry ticket for shows.

Effects of masking of interlaced images by a revealing raster allowing, when the revealing raster and the image are superposed, the observation of an image by displacing the revealing raster with respect to the image or by changing the angle of observation, are known from patent applications EP 2 367 695, EP 2 585 308 and EP 2 586 014 and from patent EP 2 454 102.

However, these patents are limited to the viewing of a single interlaced image at a time.

Also known from patent application EP 2 740 607 is a system comprising a revealing raster, a layer exhibiting pigments orientable by an external magnetic field and a magnetic layer exhibiting a raster of North and South poles, the revealing raster and the raster of North and South poles being of different colors. WO 2014 096 794 describes a first raster on which a second surface raster is embossed, the raster lines of the first raster exhibiting one and the same color in visible light and different colors when they are observed under a combination of visible light and invisible light and the two rasters being such that the device exhibits a different color, according to the angle of observation, when it is exposed to a combination of visible light and invisible light.

SUMMARY

A need exists to benefit from secure items comprising an anti-forgery optical system using the tools of the players in the field of secure items, which is capable of producing optical effects able to contribute to the authentication and/or the identification of the item, and whose possible incorporation in an item such as a paper may be done relatively easily.

The invention is aimed at answering this need and a subject thereof is, according to a first of its aspects, a secure item comprising a first optical structure and a second optical structure, or an assembly comprising a secure item and another object, the secure item comprising one of a first optical structure and of a second optical structure and the object comprising or forming the other of the first optical structure and of the second optical structure, the first optical structure comprising a plurality of blocks of first optical structure which are arranged in different regions of the first optical structure, the first optical structure being one of a revealing raster and of a combined image and the second optical structure being the other of the revealing raster and of the combined image, the combined image or, in the presence of combined-image blocks, each of the combined-image blocks, being composed of a plurality of interlaced images, at least two blocks of first optical structure each allowing, when the revealing raster and the combined image are superposed, for at least one given position and given orientation of the revealing raster with respect to the combined image and for at least one angle of observation, the observation of an image revealed at the level of each block of first optical structure, the images revealed at the level of the two blocks of first optical structure unveiling different proportions of the interlaced images.

The fact that there are several blocks of first optical structure giving different revealed images makes it possible to have multiple visual effects in the various blocks.

By virtue of the invention, it is possible to benefit from a secure item offering a novel means of authentication, consisting of the formation of different revealed images, leading for example to the formation of a particular colored pattern easily recognizable by the man in the street.

The aforementioned other object is for example similar in its function and/or in its shape to the secure item according to the invention. For example, the secure item and the other object are banknotes, especially with the same fiduciary value. The secure item and the other object may then be differentiated one from the other only by a serial number for example.

By "the images revealed at the level of the two blocks of first optical structure unveiling different proportions of the interlaced images" is meant that each block unveils a certain proportion of each of the interlaced images of the combined image to form the revealed image. For each revealed image, the proportion of an interlaced image lies between 0 and 1, the value 0 being allocated to an interlaced image when the latter is not a component of the revealed image, that is to say when the latter is totally occulted by the revealing raster at the level of the corresponding block and the value 1 being allocated when the entirety of the interlaced image is a component of the revealed image, that is to say when the latter is not occulted at all by the revealing raster at the level of the corresponding block.

Thus, when the first optical structure is a revealing raster, the subject of the invention is a secure item comprising a revealing raster and a combined image, or an assembly comprising a secure item and another object, the secure item comprising one of the revealing raster and of the combined image and the object comprising or forming the other of the revealing raster and of the combined image, the combined image being composed of a plurality of interlaced images, the revealing raster comprising a plurality of blocks arranged in different regions of the revealing raster, at least two revealing raster blocks each allowing, when the revealing raster and the combined image are superposed, for at least one given position and given orientation of the revealing raster with respect to the given combined image and for at least one angle of observation, the observation of an image revealed at the level of each block, the images revealed at the level of the two blocks unveiling different proportions of the interlaced images.

Thus, when the first optical structure is a combined image, the subject of the invention is a secure item comprising a revealing raster and a combined image, or an assembly comprising a secure item and another object, the secure item comprising one of the revealing raster and of the combined image and the object comprising or forming the other of the revealing raster and of the combined image, the combined image comprising a plurality of blocks arranged in different regions of the combined image, each combined-image block being composed of a plurality of interlaced images, at least two interlaced-image blocks each allowing, when the revealing raster and the combined image are superposed, for at least one given position and given orientation of the revealing raster with respect to the given combined image and for at least one angle of observation, the observation of an image revealed at the level of each block, the images revealed at the level of the two blocks unveiling different proportions of the interlaced images.

Combined Image

Preferably, the combined image or each of the combined-image blocks comprises a periodic alternation of elements of images interlaced in one or more directions.

The combined image or each of the combined-image blocks may comprise at least two interlaced images, preferably at least three.

The combined image or each of the combined-image blocks may comprise at least two elements of each interlaced image, preferably at least three.

According to the or each of the directions, the successive elements of one and the same interlaced image may be mutually spaced by a distance defining a period.

The or each period may lie between 10 μm and 1 mm, preferably between 50 μm and 200 μm.

Preferably, the elements of interlaced images belonging to different interlaced images are of different colors. There is for example a colorimetric disparity ΔE*94 according to C.I.E. 1994 of greater than or equal to 2, preferably greater than or equal to 3. This makes it possible to have a polychrome combined image.

As is commonly admitted and specified in C.I.E. 1994, the color is defined by the combination of three parameters, namely hue, saturation and luminosity. Hue corresponds to the perception of the color measured on a chromatic disk, saturation corresponds to the purity of the color and luminosity corresponds to the degree of clarification or of darkening of a color.

Preferably, the elements of interlaced images belonging to different interlaced images are of different hues.

The elements belonging to different interlaced images, especially to at least two of the different interlaced images, may be different by their aspects, especially their hues, opacities, saturations, luminescences or brightnesses, and/or exhibit a contrast, especially a contrast of saturation, of intensity, of hue and/or of luminance, and/or a sufficient colorimetric disparity to make it possible to distinguish, especially under white light, two adjacent interlaced-image elements when they are observed with a certain enlargement. Thus, at least two of the, better all the interlaced images, are of different aspects.

The interlaced-image elements of one and the same interlaced image are, preferably, of the same color but of a different color from those of the other interlaced images. When superposing the revealing raster with the combined image, under given observation conditions, the image revealed by each of the blocks may then be an image whose color is defined by the proportion of each interlaced image that is visible, that is to say the proportion of each color. The images revealed at the level of at least two blocks are of different colors. For example, the combined image or each combined-image block comprises three interlaced images of respective colors red, green and blue and each revealed image is of a color dependent on its proportion in each of the interlaced images, the color being easily determinable by its RGB coordinates. The RGB coordinates take the form of three numbers lying between 0 and 255 characterizing said color, each number representing the proportion of one of the components red, green and blue making it possible to obtain said color.

By "under given observation conditions" is meant a given position and a given orientation of the revealing raster with respect to the combined image and a given angle of observation of the revealing raster and of the combined image.

The colors of the elements of interlaced images may or may not be primary colors.

Preferably, the combined image or each combined-image block, and the interlaced images that the image or the block comprises, are rasterized images; the combined image or each combined-image block may be a colored raster.

The elements of interlaced images may be fluorescent and exhibit aspects, especially colors, that differ under UV light. This makes it possible to have revealed images observable under UV light that may or may not differ from the revealed images observable in visible light.

When the elements of interlaced images are luminescent, they may or may not be visible in white light.

The elements of interlaced images are preferentially all of the same dimension in the or each of the directions.

The dimension of the elements of interlaced images in the or one of the directions is, preferably, equal to the period in this direction divided by the number of interlaced images. This dimension may be less than or equal to 1 mm, better less than or equal to 100 μm, better still less than or equal to 50 μm. Thus, the elements of interlaced images are adjoining. Each interlaced-image element may be partially superposed with one of the adjacent elements, the superposition width being less than or equal to 10%, better 5% of the dimension of the interlaced image element in said direction.

As a variant, at least two elements of interlaced images may be of different dimensions in the or one of the directions.

The elements of interlaced images have, preferably, the same general shape.

For example, the combined image or each combined-image block comprises a periodic alternation of interlaced image lines, of longitudinal axes which are mutually parallel in one direction. The longitudinal axes of the interlaced image lines define a general orientation of the combined image or of each combined-image block.

Each interlaced image may be formed of continuous or discontinuous lines, preferably continuous, two successive lines of the same interlaced image being spaced apart by a distance S defined between the longitudinal axes of the two adjacent lines, this latter defining the period of the combined image or of the combined-image block. The lines of one and the same interlaced image may or may not all be identical.

The lines of an interlaced image are, preferably, all of the same length. But it may be otherwise, and at least two interlaced image lines may be of different lengths.

Each line of an interlaced image is preferentially of constant width l over the whole of its length, its longitudinal edges being mutually parallel.

The interlaced image lines are, preferably, all of the same width.

The width l of the interlaced image lines is, preferably, equal to the period divided by the number of interlaced images. Thus, the interlaced image lines are adjoining. The width l of the interlaced image lines may be less than or equal to 1 mm, better less than or equal to 100 μm, better still less than or equal to 50 μm.

Each line of interlaced images may be partially superposed with one of the adjacent lines, the width of the superposition being less than or equal to 10%, better 5% of the width of said line of interlaced images.

As a variant, at least two interlaced image lines are of different widths.

The interlaced image lines have, preferably, the same general shape, stated otherwise, the edges of the interlaced image lines are mutually parallel. The interlaced image lines may be rectilinear, or not, for example curved, undulated or crenellated.

The combined image or each combined-image block may exhibit a resolution of greater than or equal to 800 dpi. Stated otherwise, it requires for its production other means of printing or of manufacture capable of producing details corresponding to such a resolution.

The combined image or each combined-image block may be as such, that is to say on being observed directly without involving the revealing raster, of homogeneous aspect to the naked eye and at a normal observation distance having regard to its fineness. In particular, the combined image may appear to the naked eye and at a normal observation distance as having a uniform aspect, especially color. This makes it possible if so desired, to have revealed images which exhibit a homogeneous aspect to the naked eye and at a normal observation distance.

By "normal observation distance" is meant the customary distance of observation of a secure item, for example 30 cm and preferably 15 cm.

In the case of interlaced images of various colors, the combined image and the revealing raster may be disposed in such a way that the revealed images each appear of solid color.

The combined image and/or each combined-image block may exhibit any suitable contour, and especially its contour may define a pattern which is situated elsewhere on the item; the combined image is for example of contour defining a pattern such as a person, animal, plant, monument or alphanumeric sign, which appears elsewhere on the item, for example in the form of a printing or of a watermark.

Revealing Raster

Preferably, the revealing raster or each revealing raster block (hereinafter "raster block") comprises a periodic alternation of two raster elements in one or more directions.

Preferably, the revealing raster or each raster block comprises at least four raster elements, more preferentially at least six.

As a variant the revealing raster or each raster block comprises a periodic alternation of at least three raster elements. In particular a revealing raster or a raster block comprising a periodic alternation of an infinity of raster elements forms a periodic gradation.

The raster elements are, preferably, of different opacities, transparencies and/or hues, in particular one raster element is opaque and the other element is at least partially transparent. For example, each block is formed of a periodic alternation of occulting elements, for example black substantially opaque and of non-occulting elements, for example transparent, otherwise called line spacings. Therefore, when the revealing raster and the combined image are superposed, the occulting elements prevent the observation of a part of the combined image and the non-occulting elements unveil the remainder of the combined image.

As a variant, the occulting raster element is a filter which is such that when it is superposed with the combined image, the combined-image parts with which it is superposed are not visible. For example, the revealing raster is a colored filter not allowing through any of the colors of the combined image.

For one and the same dimension in a direction of the elements of interlaced images, a revealed image obtained by a revealing raster or a raster block exhibiting occulting raster elements of small dimension comprises a larger proportion of interlaced images, especially of colors, than a revealed image obtained with a revealing raster or a raster block exhibiting occulting raster elements of larger dimension.

The revealing raster comprises occulting raster elements and non-occulting raster elements.

The occulting elements afford a visual contrast with the non-occulting elements. The boundary between an occulting element and a non-occulting element is thus determined by the fact of being able or not being able to observe the effect sought, by superposition with the combined image.

This observation may be done through the non-occulting elements. As a variant, the combined image is situated between the revealing raster and the observer, and the occulting elements prevent the observer from discerning the occulting elements of the interlaced image which are superposed with it. In examples, the non-occulting element is perfectly transparent or of a sufficiently low uniform opacity or else of a sufficiently bright hue to make it possible to observe through it or on it the element or elements of interlaced images leading to the effect sought. In this case, the dimension in a direction of the non-occulting element corresponds to the width in this direction of the perfectly transparent region or region of sufficiently low uniform opacity or of sufficiently bright hue. In these examples, the transition between an occulting element and a non-occulting element is stark. In other examples, the occulting element and/or the non-occulting element forms (form) a gradation. In this case the limit of the non-occulting element in a direction, useful for determining its dimension in this direction, is that on the basis of which the opacity is sufficiently high or the hue sufficiently dark to avoid seeing the effect sought through or on the element. For example, in the case where the transition between an occulting element and a non-occulting element occurs with a continuous gradation of gray of opacity varying in a direction between $Op_{min}$ and $Op_{max}$, and when, beyond an opacity $Op_{occ}$, it is no longer possible to see the effect sought through the element, the dimension of the non-occulting element is given by the dimension in this direction of the region of the element where the opacity is less than or equal to $Op_{occ}$.

Preferably, the revealing raster comprises a finite number of raster elements. Preferably still, the raster elements do not exhibit any gradation.

Preferably still, the non-occulting elements are each of uniform opacity or luminosity (L* in the CIE94 (L*, a*, b*) system), which may be zero, respectively low, and the occulting elements are also preferably of uniform opacity or luminosity.

The revealing raster or each block may comprise at least 5 occulting raster elements in the or each of its directions.

For example, the revealing raster or each raster block comprises a periodic alternation of two raster lines of mutually parallel longitudinal axes. Preferably, the two raster lines have parallel longitudinal axes and define a general orientation of the revealing raster or of the block.

Preferably, each raster line is of constant width over the whole of its length, its longitudinal edges being mutually parallel. The occulting raster lines and the non-occulting raster lines which alternate with one another may or may not be of the same width.

Preferably, the two raster lines have the same general shape, especially the same general shape as the interlaced image lines.

The two raster lines are, preferably, rectilinear, but as a variant the revealing raster comprises raster lines which are not rectilinear, being for example curved, undulated or crenellated.

Preferably, the edges of one of the raster lines are parallel to the edges of the other of the raster lines.

The resolution of the revealing raster is, preferably, greater than or equal to 800 dpi.

The revealing raster may be as such of homogeneous aspect to the naked eye and at a normal observation distance, having regard to its fineness. In particular, the revealing raster may appear observed with the naked eye at a normal observation distance and in white light as having a uniform aspect, especially color.

The revealing raster may exhibit a contour of any shape, for example circular, oval, disk section, star, polygonal, for example rectangular, square, triangular, hexagonal, pentagonal or lozenge-shaped, or form a more complex pattern, especially a pattern representing a text, an alphanumeric sign, an ideogram, an object, a person, a plant, a monument and/or an animal.

The revealing raster may comprise an inclusion of another security means, especially of another revealing raster.

Raster Block and/or Combined-Image Mock

The revealing raster may comprise a plurality of raster blocks, the combined image comprising a single combined-image block and being composed of a plurality of interlaced images.

As a variant, the revealing raster comprises a single raster block and the combined image exhibits a plurality of combined-image blocks, each combined-image block being composed of a plurality of interlaced images.

As a further variant, the revealing raster and the combined image may each be formed of several blocks, each combined-image block being composed of a plurality of interlaced images.

Said at least two blocks of first optical structure preferentially have the same general orientation or the same general orientations.

Advantageously, when the revealing raster and the combined image are superposed, the raster and the combined image have the same general orientation or the same general orientations. Therefore, when the revealing raster and the combined image are superposed, the raster elements are superposed with the elements of interlaced images of the combined image; the occulting raster elements prevent the observation of a part of the elements of interlaced images of the combined image, and the elements of non-hidden interlaced images form the revealed images.

Said at least two blocks of first optical structure, better all the blocks of first optical structure, are preferentially of the same period, especially in the direction or directions.

In the case where the first optical structure comprises a periodic alternation in one or more directions, said at least two blocks of first optical structure may comprise corresponding raster or combined-image elements of different dimensions and/or be mutually phase-shifted in one of their directions, by a phase shift distance $d_{ij}$ of less than the period of the blocks of first optical structure in this direction, the phase shift distance $d_{ij}$ being the remainder of the division of the distance in said direction between

- when the two blocks are raster blocks, the axis of an occulting element of one of the two raster blocks and the axis of an occulting element of the other of the two raster blocks by the period, or
- when the two blocks are combined-image blocks, the axis of an element of interlaced images of one of the two combined-image blocks and the axis of an element of the same interlaced image of the other of the two combined-image blocks by the period.

Preferably, the period of the revealing raster or of each of the raster blocks in a direction is substantially equal to the period of the combined image or of each of the combined-image blocks in at least one of these directions.

When the raster elements and combined-image elements are lines, said at least two blocks of first optical structure preferentially have the same general block orientation, and preferably the raster lines or combined-image lines of these blocks have parallel longitudinal axes. Advantageously, all the blocks of one and the same first optical structure have the same general orientation and define a general orientation of the first optical structure.

Each of the blocks of first optical structure may comprise a larger dimension of between 1.4 mm and 42 mm.

Each of the blocks of first optical structure may represent less than 90% of the total area of the first optical structure and more than 0.2% of the latter.

Said at least two blocks of first optical structure may be arranged in distinct regions of the first optical structure. Said at least two blocks of first optical structure exhibit, preferably, a part of their contours in common.

As a variant, when the first optical structure is the revealing raster, said at least two blocks of the revealing raster are arranged in regions of the revealing raster that are partially superposed. The superposition region defines a sub-block having the shape of a new raster. The raster of the sub-block may exhibit in some exemplary implementations

- a periodic alternation in the or a direction of two raster elements, especially of different aspects, with an occulting raster element having a dimension in this direction that is greater than or equal to that of the raster elements of each of the blocks being superposed, and/or
- a periodic alternation in the or a direction of four raster elements, the raster elements of the two blocks being mutually interleaved, each raster element exhibiting in particular a different aspect from the directly adjacent raster elements.

Each block of first optical structure may exhibit a contour of any shape, for example circular, oval, disk section, star, polygonal, for example rectangular, square, triangular, hexagonal, pentagonal or lozenge-shaped, or form a more complex pattern, especially a pattern representing a text, an alphanumeric sign, an ideogram, an object, a person, a plant, a monument and/or an animal.

All the blocks of first optical structure may exhibit a contour of like shape; as a variant the blocks exhibit contours of different shapes.

In the case where the revealing raster comprises blocks, the area and/or the length and/or the width and/or the largest dimension, of the revealing raster may be respectively less than or equal to the area and/or the length and/or the width and/or the largest dimension, of the combined image. In this way, it is possible to simultaneously view the images revealed by all the blocks and the user may immediately compare these revealed images with one another to conclude as to the authenticity of the item.

As a variant, in the case where the combined image comprises blocks, the area, the length and/or the width and/or the largest dimension, of the combined image may be respectively less than or equal to the area, the length and/or the width and/or the largest dimension, of the revealing raster. In this way, it is possible to simultaneously view the images revealed by the revealing raster and the user may immediately compare these revealed images with one another to conclude as to the authenticity of the item.

The revealed images are observable in reflected light and/or in transmitted light, and preferably they are observable at one and the same time in reflected light and in transmitted light.

Advantageously, the revealed images exhibit a homogeneous aspect to the naked eye and at a normal observation distance, especially a homogeneous color.

The revealed images are, preferably, observable at one and the same time on the revealing raster side and on the combined image side.

Preferably, the revealed images exhibit different aspects, especially different colors and/or brightnesses.

At least one revealed image may consist of at least two adjacent interlaced images.

As a variant, at least one revealed image may comprise a single interlaced image.

Preferably, the revealed images form a macropattern when the revealing raster is superposed with the combined image, under given observation conditions. Preferably, this macropattern is visible when the orientation of the revealing raster is the same as that of the combined image.

The macropattern may change aspect upon a change of the position of the revealing raster with respect to the combined image, especially upon a displacement in one of the directions of the combined image, and/or a change of the angle of observation. For example, in the case of a combined image or of combined-image blocks formed of interlaced images of various colors, the pattern may change color. This change of aspect may give an impression of motion. For example, in the case of a revealed image of a certain color, the user may have the impression, by changing the position of the revealing raster with respect to the combined image, that the color block moves from one raster block to another.

The macropattern may disappear upon a change of the orientation of the revealing raster with respect to that of the combined image, especially when the orientation of the raster becomes different from that of the combined image.

The macropattern formed may be of any form, especially represent a text, an alphanumeric sign, an ideogram, a geometric shape, an object, a person and/or an animal.

The secure item or the assembly may comprise a second revealing raster separated from the first revealing raster and intended to be superposed with the same combined image.

As a variant, the combined image or each combined-image block may be formed of a periodic alternation of pixels of interlaced images in two non-parallel directions, especially separated by an angle of 60° or of 90°, preferably perpendicular.

By "pixels" is meant an elementary pattern. A pixel may be of polygonal shape, especially triangle, hexagon, rectangle or square.

The revealing raster or each raster block may be formed of a periodic alternation of occulting raster pixels and of non-occulting gaps in the same two directions and with the same periods in the two directions. Thus, the occulting raster pixels prevent the observation of a part of the pixels of interlaced images unveiling only a certain proportion of each interlaced image for each revealed image.

As a variant, when the combined image or each combined-image block is formed of a periodic alternation of pixels of interlaced images in two non-parallel directions, the associated revealing raster or each associated raster block may be simplified by defining a periodic alternation of occulting raster elements and of non-occulting raster elements in the form of lines.

Observation

The combined image and/or the revealing raster may be carried on the secure item or the other object by a printing method, especially offset, copper-plate, laser, heliogravure, typography or silk-screen printing, the combined image and/or the revealing raster being printed with opaque, fluorescent, translucent and/or transparent, colored or non-colored inks, visible with the naked eye, under ultraviolet (UV) and/or infrared (IR) light.

The combined image may be printed especially by a combination of colors exhibiting sufficient respective colorimetric disparities, for example printing with CMYB (Cyan, Magenta, Yellow, Black) and preferably with RGB (Red, Green, Blue).

Advantageously, metallizations and/or demetallizations are used to avoid forgery by printing.

Thus, the combined image and/or the revealing raster may comprise metallizations and/or demetallizations, for example of different metals, especially copper or aluminum and their alloys.

The at least of the combined image and of the revealing raster may feature on an at least partially transparent region of the secure item, the superposition of the revealing raster and of the combined image being performed by folding the secure item or by superposing the secure item with the other object. Each of said at least two blocks may make it possible, when superposed at least partially with the combined image of the secure item or of the other object, to observe different revealed images by a relative displacement of the revealing raster with respect to the combined image. For example, in the case where the combined image is formed of interlaced images of different colors, one of the blocks may allow, when it is superposed with the combined image so that they have the same orientation, the observation of a certain color and said color may change upon a change of the angle of observation and/or when the revealing raster is displaced in the or one of the directions of the combined image and of the revealing raster, especially perpendicularly to the longitudinal axes of the raster lines of the block and of the interlaced image lines.

The folding of the secure item may be done along a mid-line of the item, preferably parallel to a side of the item, for example along a mid-line passing through the middle of the length of the item.

The combined image and/or the revealing raster may be printed with liquid crystals and be carried on a region of the secure item or of the object polarizing the light in such a way that the combined image and/or the revealing raster are visible only upon folding the item on itself or upon superposing the secure item with the other object.

The revealing raster and the combined image may be superposed while being separated from one another by a gap of constant thickness. This gap may be formed by a transparent or translucent substrate exhibiting on the side of a first face of the substrate the combined image and on the side of a second face of the substrate, opposite to the first face, the revealing raster superposed with the combined image. Each of said at least two blocks may then make it possible to observe different revealed images, through a parallax effect, upon a change of the direction of observation of the secure item. The gap between the revealing raster and the combined image is, preferably, greater than or equal to the period of the revealing raster, especially lying between 10 μm and 1 mm, being for example less than 25 μm.

The substrate may comprise or consist of a thermoplastic substance, for example a polyolefin, for example polyethylene (PE), polyvinyl chloride (PVC), polyester, polyethylene terephthalate (PET), polycarbonate (PC), polyester carbonate (PEC), polyethylene terephthalate glycol (PETG), acrylonitrile butadiene styrene (ABS) or a light-collecting film for example of the "waveguide" type, for example a luminescent film based on polycarbonate marketed by the company BAYER under the name LYSA®.

The substrate may comprise cellulose fibers and especially paper. In particular, the substrate may be a paper which is sufficiently translucent to make it possible to reveal the interlaced images, especially a tracing paper.

The substrate may or may not also be locally transparentized, by watermarking such as described in patent EP 1252389 or by applying a generally fatty composition which transparentizes it in a permanent manner, for example a composition made of oil and of transparent mineral material, as described in U.S. Pat. No. 2,021,141, or for example a composition in the form of a wax combined with a solvent.

It is also possible to transparentize the substrate by locally applying a wax by hot transfer, as described in U.S. Pat. No. 5,118,526.

It is further possible to use for the substrate a fibrous layer comprising a thermofusible substance, for example polyethylene, as described in patent EP 0 203 499, which under the local action of heat will have its transparency varied.

Secure Item

The secure item may be at least partially made of paper or plastic, in particular may comprise a rolled or extruded plastic sheet.

The secure item may comprise at least one ply of paper, especially based on natural and/or synthetic fibers, for example cotton or linen fibers in the case of a banknote.

The secure item may be at least partially transparent, opaque or translucent, especially opaque in reflected light and translucent in transmitted light.

The combined image and/or the revealing raster may be carried by a film, a lamination band, a patch and/or a foil featuring on the secure item. The film, the lamination band, the patch and/or the foil may comprise metallizations and/or demetallizations, for example of aluminum or copper, or all types of printings.

By "patch" is meant an element of smaller dimensions than that of the secure item and which might not extend as far as the edge of the item. The patch may exhibit a polygonal, circular, oval contour or one forming a more complex pattern, especially a pattern representing a text, an alphanumeric sign, an ideogram, an object, a person, a plant, a monument and/or an animal.

By "foil" or "lamination band" is meant an element applied, in particular hot, for example by transfer onto the secure item in particular from a carrier structure.

The film, the lamination band, the patch and/or the foil may comprise holographic prints and/or liquid crystals.

The combined image and/or the revealing raster may further be carried by a security thread, incorporated at the surface, bulk-wise or preferably as window(s) in the secure item.

The combined image and/or the revealing raster may be incorporated window-fashion in the secure item.

The window may be formed on the secure item during its manufacture.

The window may be formed by a material void, for example the local absence of paper, above or below the combined image and/or the revealing raster, the window preferably being at least partially transparent or translucent on the side of the combined image and/or of the revealing raster opposite to the material void.

The window may also not comprise any material void. The window may for example be at least partially transparent or translucent above or below the combined image and/or the revealing raster, the transparent or translucent regions being superposed one with the other in such a way as to be able to observe the two opposite sides of the secure item.

The window may also be a through-window. The window may exhibit superposed material voids on either side of the revealing raster and/or of the combined image. Two sides of the combined image and/or of the revealing raster may thus be observable directly and not through transparent or translucent regions. The security raster and/or the combined image may be incorporated totally in the window or partially.

The item may further exhibit a plurality of windows such as described hereinabove. The windows may or may not all be of the same type. Exemplary embodiments of windows in secure items are for example given in GB 1 552 853 which discloses the creation of a window especially by transparentization, laser cutting, mechanical incision or abrasion, EP 0 229 645 which describes the creation with the aid of masks of a window on one face or on both faces of a two-ply paper, WO 2004/096482 which describes the creation of a window by laser cutting, CA 2 471 379 which describes the creation of a transparent window and association with a security element and WO 2008/006983 which describes the creation of a transparent window on a two-ply paper.

The secure item may further comprise a security thread exhibiting the combined image and/or the revealing raster, especially a succession of combined images and/or of revealing rasters.

The secure item may further comprise two security threads, the one carrying at least one combined image and the other carrying at least one corresponding revealing raster. The security thread or threads may exhibit a sufficient width to enable the combined image and/or the revealing raster to be made to feature therein in full. The width of the security thread or threads is preferably between 3 and 20 mm, more preferentially between 4 and 10 mm and for example equal to 6 mm.

As indicated above, the revealing raster and/or the combined image advantageously feature on an at least partially transparent region of the item, in particular the revealing raster and/or the combined image may be at least partially transparent.

The at least partially transparent region may correspond to a recess, passing right through or not, of the item in which the revealing raster and/or the combined image is placed.

The region consists for example of a translucent tracing paper.

The region may further consist of a polymer layer comprising for example polyethylene (PE), polyvinyl chloride (PVC), polyethylene terephthalate (PET), polycarbonate (PC), polyester carbonate (PEC), polyethylene terephthalate glycol (PETG), acrylonitrile butadiene styrene (ABS) or a light-collecting film for example of the "waveguide" type, for example a luminescent film based on polycarbonate marketed by the company BAYER under the name LYSA®.

The secure item, as well as the elements that it comprises such as for example a security thread, a patch and/or a foil, may comprise one or more additional security elements such as defined hereinafter.

Among these additional security elements, some are detectable by eye, in daylight or in artificial light, without using a particular apparatus. These security elements comprise for example colored fibers or slivers, totally or partially metallized or printed threads. These security elements are termed first level.

Other types of security elements are delectable only with the aid of a relatively simple apparatus, such as a lamp emitting in the ultraviolet (UV) or the infrared (IR). These security elements comprise for example fibers, slivers, bands, threads or particles. These security elements may or may not be visible with the naked eye, being for example luminescent under a lighting of a Wood lamp emitting at a wavelength of 365 nm. These security elements are termed second level.

Other types of security elements further require for their detection a more sophisticated detection apparatus. These security elements are for example capable of generating a specific signal when they are subjected, simultaneously or not, to one or more sources of exterior excitation. The automatic detection of the signal makes it possible to authenticate, if relevant, the item. These security elements comprise for example tracers taking the form of active substances, of particles or of fibers, capable of generating a specific signal when these tracers are subjected to an optronic, electrical, magnetic or electromagnetic excitation. These security elements are termed third level.

The additional security elements present within the secure item may exhibit security characteristics of first, second or third level.

The secure item may be a payment means, such as a banknote, a check, a bank card or a restaurant voucher, an identity document such as an identity card or a visa or a passport or a driver's license, a lottery ticket, a secure card, a transport pass or else an entry ticket to cultural or sports shows.

Imager

As a variant, the other object is an electronic imager making it possible to form a first image so as to be able to superpose it with a second image present on the secure item, the first image being one of the first optical structure and of the second optical structure and the second image being the other of the first optical structure and of the second optical structure By "electronic imager" is meant an electronic device making it possible to produce an image by display or projection.

The electronic imager may comprise a screen on which the first image is displayed.

The electronic imager may comprise a screen of any known type, for example a screen of a computer, of a television, of a mobile telephone, of an electronic book or diary, of a personal digital assistant, of a digital tablet, of a watch dial, this list being nonlimiting.

The electronic imager may be a projector, with or without a screen on which the projection is performed. The projector may make it possible to project the first image onto a background or onto the security item.

The electronic imager may be a projector of any known type, for example a slide projector, a video projector, a backprojector, a picoprojector or nanoprojector, for example a miniaturized video projector integrated into a portable apparatus (PDA, mobile telephone, laptop computer, for example), a cinematographic projector, this list being nonlimiting.

The electronic imager preferably makes it possible to generate a pixellated image, each pixel of which is individually addressable, preferably with at least 256 gray levels or colors, and/or with a resolution of between 50 and 1000 dpi ("Dots Per Inch").

The electronic imager may be a projector projecting a visible, infrared (IR) and/or ultraviolet (UV) light.

The electronic imager may comprise a screen of the LCD ("Liquid Crystal Display"), LED ("Light Emitting Diode"), OLED ("Organic Light Emitting Diode"), laser, plasma, electrochromic, FED ("Field Emission Display"), SED ("Surface-conduction Electron-emitter Display"), LCOS ("Liquid Crystal On Silicon") type or else a cathode ray tube.

The electronic imager preferably comprises a liquid crystal screen (LCD).

The screen may exhibit a resolution of between 50 and 600 dpi, better between 100 and 300 dpi, for example equal to 160 dpi.

The second image may feature on a region of reduced opacity of the secure item. Such a region of reduced opacity may in particular correspond to a region of lesser thickness, to a region rendered transparent or to a region comprising at least one layer of a material of lesser opacity. The opacity of said region of reduced opacity will in particular be sufficiently low to allow observation in transmission of the first image. Preferably, the second image is visible in transmission and in reflection.

The second image may feature on an at least partially transparent or translucent region of the secure item.

When the electronic imager produces the first image by means of a polarized light, the second image features preferably on an at least partially transparent or translucent region, especially an at least partially transparent window.

The first image produced by the electronic imager may be displayed on the electronic imager, for example on a screen of the electronic imager.

As a variant, the first image is projected by the electronic imager, for example onto a background or onto the secure item. In particular, when the first image is projected onto a background, the second image of the secure item may be superposed with the first image projected onto the background. As a variant, the first image is at least partially projected on the second image of the secure item.

The item and the imager may or may not come into contact when the images are superposed.

The first image and/or the second image may exhibit polarization properties.

For example, the first image is produced by the electronic imager by means of polarized light, especially rectilinearly, circularly or elliptically polarized light. The electronic imager may comprise a screen emitting polarized light or may project polarized light.

The secure item may comprise a polarizing filter. In particular, the second image may be produced with the aid of a polarizing filter.

The second image may be produced according to at least one of the following steps:

- production of one or more perforations in at least one polarizing filter to form the second image,
- local heating of at least one polarizing filter, for example with the aid of a laser, so as to locally suppress the polarizing properties of the filter and to form the second image,
- selective application, for example by printing and/or gluing, to at least one polarizing filter, of a diffusing material, for example a colloidal silica and/or an adhesive band, to form the second image, carrying out of at least one selective attack by chemical reaction and/or by emission of luminous radiation, in particular ultraviolet (UV) and/or infrared (IR) and/or laser, on at least one polarizing filter, optionally with the aid of a mask, to form the second image, so as in particular to locally cancel the polarizing effect of the filter, application, in particular by printing or by coating, of at least one polarizing effect, in particular of a polarizing compound, for example with the aid of an ink comprising said polarizing compound, on a non-polarizing given substrate, in particular a polymer film, to form the second image, application, in particular by printing or by coating, of at least one composition comprising liquid crystals, cholesteric crystals in particular, for example such as that marketed by the company SICPA under the name Oasis®, to a polarizing given substrate, in particular a polymer film, to form the second image.

By way of remark, according to the desired effect, the above-stated steps will be carried out so as to form an image which is the image in positive or in negative of the second image. In particular, a polyether base aliphatic polyurethane, for example such as that marketed by the company LAMBERTI under the name Esacote® PU 21/S, can be applied locally to at least one polarizing filter, for example by printing.

In the last possibility mentioned hereinabove, when during the implementation of the method according to the invention, the composition comprising cholesteric liquid crystals is situated between the polarizing substrate and the electronic imager, the cholesteric liquid crystals modify the electronic imager's polarized light which is not stopped by the substrate and the regions covered with cholesteric liquid crystals appear transparent when the polarizing substrate is oriented in such a way as to be opaque.

On the other hand, when the polarizing substrate is situated between the composition comprising cholesteric liquid crystals and the electronic imager, the cholesteric liquid crystals exhibit an optically variable effect when the polarizing substrate is oriented in such a way as to be opaque. The optically variable effect of the cholesteric liquid crystals is more generally known by the term “colorshift” effect, the color of the cholesteric liquid crystals depending on the angle of observation and the latter being in particular observed on a dark background, preferably black in color. The “colorshift” effect of the cholesteric liquid crystals may constitute an additional security to authenticate and/or identify the secure item.

Thus, in particularly preferred exemplary implementations of the method according to the invention, the second image is defined by a first polarizing material superposed on a second polarizing material, the first material extending in particular according to patterns corresponding to the second image and the second material extending in a continuous manner. The first material is preferably a printing of cholesteric liquid crystals and the second material is preferably a linearly polarizing substrate.

By “patterns corresponding to the second image” is meant that said patterns form the second image in negative or in positive.

Advantageously, when the first and second images exhibit polarization properties, there exists only a single orientation of one with respect to the other allowing one to partially mask the other. Stated otherwise, there exists only a single orientation of the first image with respect to the second image making it possible not to be able to observe the first image through the polarizing regions of the second image, or vice versa. Indeed, the first and second images exhibiting polarization properties consist of polarizing regions and of non-polarizing regions. When they are placed in front of a luminous source emitting polarized light, there exists only a single orientation according to which the polarizing regions become opaque.

In particular, in the case where the item comprises a polarizing filter there exists for example only a single orientation of the second image with respect to the first image projected or displayed by the electronic imager by means of a polarized light, which allows the polarizing filter to mask the polarized light of the electronic imager. The polarizing filter may appear opaque, especially black in color, only in this, preferably unique, orientation of the first image with respect to the second image.

The presence of a unique orientation, such as described hereinabove, of the first and second images with respect to one another may make it possible to authenticate and/or to identify the secure item according to a first security level.

The electronic imager, for example the screen of the electronic imager, and/or the secure item, may comprise an indicator making it possible to advise the user on the way of positioning the first and second images with respect to one another to obtain said orientation, for example a visual reference marker.

According to a variant embodiment, the second image is printed with a compound, especially liquid crystals, which is visible only when placed in front of an electronic imager emitting polarized light, especially a liquid crystal screen. Advantageously, the second image is transparent under unpolarized illumination, for example under natural lighting, and is visible only under polarized illumination with the aid of the electronic imager, thereby affording the secure item an additional security.

The secure item may comprise an integrated microcircuit, for example an RFID chip or an optical chip (activated for example by the light issuing from the electronic imager), able to communicate with the electronic imager so that the latter produces, in particular displays and/or projects, a piece of information advising as regards the way of positioning the first and second images with respect to one another to obtain said orientation.

The secure item may comprise an integrated microcircuit, for example an RFID chip or an optical chip, able to communicate with the electronic imager so that the latter produces at least one first image whose association with the second image makes it possible to implement the method according to the invention. In particular, the electronic imager may produce at least one first image associated with a second image of the secure item by communication between the electronic imager and the integrated microcircuit.

The electronic imager may further produce at least one first image on the basis of a photo and/or of a video of the secure item, especially of the second image of the secure item or of an identifier present on the item, for example a logo or a serial number. The photo and/or video may be produced with the electronic imager, an image capture device, for example a digital camera, connected to the electronic imager by a wired or non-wired link and/or be transferred to the electronic imager, for example from a data storage device or via a network, such as the Internet.

The first image may be produced solely on the basis of the photo and/or video of the secure item, or as a variant, be produced on the basis of the photo and/or video of the secure item and of an additional piece of information, for example a piece of information present on the secure item, on the photo and/or video, input by the user, or else received from a network, for example of a secure server.

The electronic imager may comprise a program making it possible to identify the secure item, and especially the second image, and to produce, especially to display and/or to project, a first image obtained from a database advising as regards the first image to be used as a function of the secure item, especially of the second image.

The electronic imager may produce several first images and/or the secure item may comprise several second images, at least one of the first images making it possible to observe the authentication and/or identification piece of information when superposed with at least one of the second images according to the method of the invention, or vice versa.

In particular, it may thus be possible to authenticate and/or to identify the security item with various types of electronic imagers.

As a variant, a given electronic imager may make it possible to authenticate and/or to identify secure items of various types, comprising in particular different second images.

For example, the second images are differentiated by their size, their color, their shape, or indeed by the spacing between the raster elements or interlaced-image elements or the width of the latter.

The first images may also be differentiated by their size, their color, their shape, or indeed by the spacing between the raster elements or interlaced-image elements or the width of the latter, or else indeed by the size of the pixels, the spacing between the pixels or the color of the pixels.

The electronic imagers may for example be differentiated on account of their brand, their model, their resolution, their type, namely computer screen, television screen or telephone screen, or projector, for example.

The presence of several first images and/or second images may make it possible to authenticate and/or to identify the security item independently of the differences mentioned hereinabove.

The first image produced by the electronic imager may originate from a communication network with which the electronic imager communicates, for example a telephone network, Internet or an internal network, the image being for example downloaded, and/or be provided together with the electronic imager, for example on a data medium, for example a hard disk, a USB key, a CD and/or a DVD. The security item may, if relevant, comprise such a data medium. The data medium may be an integrated microcircuit, for example an RFID or optical chip, communicating with the electronic imager.

The secure item may comprise a luminescent region, for example fluorescent and/or phosphorescent, and the electronic imager may project the first image onto the secure item under ultraviolet (UV) lighting.

In particular, the second image may be a luminescent print, for example carried out on a black opaque background of the secure item, and onto which the first image is projected under UV lighting. The second image is then visible only under UV lighting.

The second image may further be printed on a luminescent background of the secure item, so that it is visible at one and the same time under UV lighting and normal lighting.

Two Revealing Rasters

A further subject of the invention is, according to a second aspect, a secure item comprising a first and a second first optical structure and a second optical structure, or an assembly comprising a secure item and another object, the secure item comprising one of first and second first optical structure and of a second optical structure and the object comprising or forming the other of first and second first optical structure and of a second optical structure,

- the first and the second first optical structure each comprising a plurality of blocks of first optical structure which are arranged in different regions of said first optical structure, and/or the second optical structure comprising a plurality of blocks of second optical structure which are arranged in different regions of the second optical structure,
- the first and the second first optical structure being revealing rasters and the second optical structure being a combined image or the first and the second first optical structure being combined images and the second optical structure being a revealing raster,
- the combined image or images or each of the blocks of the combined image or images being composed of a plurality of interlaced images,
- when the first optical structures and the second optical structure are superposed, at a position of the first optical structures with respect to the second optical structure and an angle of observation,
- at least two blocks of the first first optical structure or of the second optical structure each allow, for a first orientation of the first first optical structure with respect to the second optical structure, the observation of a first image revealed at the level of each block of the first first optical structure or of the second optical structure, the images revealed at the level of the two blocks of the first first optical structure or of the second optical structure unveiling different proportions of the interlaced images,
- at least two blocks of the second first optical structure or of the second optical structure each allow, for a second orientation of the first first optical structure with respect to the second optical structure, the observation of a second image revealed at the level of each block of the second first optical structure or of the second optical structure, the images revealed at the level of the various blocks of the second first optical structure or of the second optical structure unveiling different proportions of the interlaced images,
- the first and the second orientation being different.

The fact of having two first optical structures that are superposed with the same second optical structure makes it possible, by varying the orientation of the first optical structures with respect to the second optical structure, to observe at the level of the blocks the first or the second revealed images, thereby affording an additional security.

Thus, when the first optical structure is a revealing raster, a subject of the invention is, according to this second aspect, a secure item comprising a first and a second revealing raster and a combined image, or an assembly comprising a secure item and another object, the secure item comprising one of the first and second revealing rasters and of the combined image and the object comprising or forming the other of the first and second revealing rasters and of the combined image,

- the first and the second revealing raster each comprising a plurality of raster blocks arranged in different regions of said revealing raster, and/or the combined image comprising a plurality of combined-image blocks arranged in different regions of the combined image,
- the combined image or each combined-image block being composed of a plurality of interlaced images, when the revealing rasters and the combined image are superposed, at a position of the revealing raster with respect to the combined image and an angle of observation, at least two blocks of the first revealing raster or of the combined image each allow, for a first orientation of the first revealing raster with respect to the combined image, the observation of a first image revealed at the level of said blocks of the first revealing raster or of the combined image, the images revealed at the level of the two blocks of the first revealing raster or of the combined image unveiling different proportions of the interlaced images, at least two blocks of the second revealing raster or of the combined image each allow, for a second orientation of the first revealing raster with respect to the combined image, the observation of a second image revealed at the level of said blocks of the second revealing raster or of the combined image, the images revealed at the level of the various blocks of the second revealing raster or of the combined image unveiling different proportions of the interlaced images, the first and the second orientation being different.

Thus, when the first optical structure is a combined image, a subject of the invention is, according to this second aspect, a secure item comprising a first and a second combined images and a revealing raster, or an assembly comprising a secure item and another object, the secure item comprising one of the first and second combined images and of the revealing raster and the object comprising or forming the other of the first and second combined images and of the revealing raster, the first and the second combined image each comprising a plurality of combined-image blocks arranged in different regions of said combined image, and/or the revealing raster comprising a plurality of raster blocks arranged in different regions of the revealing raster, the combined image or each combined-image block being composed of a plurality of interlaced images, when the revealing rasters and the combined image are superposed, at a position of the revealing raster with respect to the combined image and an angle of observation, at least two blocks of the first combined image or of the revealing raster each allow, for a first orientation of the revealing raster with respect to the first combined image, the observation of a first image revealed at the level of said blocks of the first combined image or of the revealing raster, the images revealed at the level of the two blocks of the first combined image or of the revealing raster unveiling different proportions of the interlaced images, at least two blocks of the second combined image or of the revealing raster each allow, for a second orientation of the revealing raster with respect to the first combined image, the observation of a second image revealed at the level of said blocks of the second combined image or of the revealing raster, the images revealed at the level of the various blocks of the second combined image or of the revealing raster unveiling different proportions of the interlaced images, the first and the second orientation being different.

The combined optical structure or structures, the revealing raster or rasters, the secure item and the object may be such as described hereinabove.

Preferably the two first optical structures have different general orientations.

The first revealed images may form a first pattern in the first orientation and the second revealed images form a second pattern in the second orientation, the first pattern not being visible in the second orientation and the second pattern not being visible in the first orientation.

Preferably, in the first orientation, the superposition of the second first optical structure with the second optical structure forms a Moiré effect and/or in the second orientation, the superposition of the first optical structure with the second optical structure forms a Moiré effect.

Preferably, in the first orientation, the general orientation of the first optical structure is the same as the general orientation of the second optical structure and in the second orientation, the general orientation of the second first optical structure is the same as the general orientation of the second optical structure.

The first and the second orientation may form an angle $\beta$ of between 0 and 180° bounds excluded, better between 10 and 30°.

Method

A further subject of the invention is a method for authenticating a secure item according to the first and the second aspects of the invention, in which the images revealed by the blocks of the revealing raster or rasters and/or of the combined image or images are observed and one concludes as to the authenticity of the item at least on the basis of this observation.

It is also possible to change the angle of observation and/or the position of the revealing raster with respect to the combined image so as to observe a change of the revealed image for each block and thus conclude as to the authenticity of the item at least on the basis of this observation.

In the case where the combined image and the revealing raster or rasters are not superposed within the item, it is possible to superpose the revealing raster at least partially with the combined image so as to observe the images revealed by the various blocks by folding the secure item and/or by superposing the secure item and the other object and one concludes as to the authenticity of the item at least on the basis of this observation.

When the secure item comprises several revealing rasters or several combined images, it is also possible to change the orientation between the revealing raster or rasters and the combined image or images so as to observe the revealed images and thus conclude as to the authenticity of the item at least on the basis of this observation.

When one of the revealing raster and of the combined image is formed by an electronic imager, the method may comprise at least one of the following steps:

superposing at least partially the second image of the item with a first image formed by the electronic imager so as to make it possible to observe an authentication and/or identification piece of information in respect of the secure item, superposing at least partially the second image of the item with a first image produced by the electronic imager subsequent to a communication between the integrated microcircuit and the electronic imager, superposing at least partially the second image of the item with a first image produced by the electronic imager on the basis of a photo and/or video of the secure item, especially of the first image.

The photo and/or video may be produced with the electronic imager, an image capture device, for example a digital camera, connected to the object and/or be transferred to the electronic imager, for example from a data storage device or via a network, such as the Internet.

The invention will be able to be better understood on reading the detailed description which will follow, of non-limiting exemplary implementations of the latter, and on examining the appended drawing in which:

FIG. 1 illustrates the formation of a combined image,

FIGS. 2A to 2C represent a succession of revealed images such as it may be observed when the observation conditions vary, FIGS. 3A to 3C represent a variant succession of revealed images such as it may be observed when the observation conditions vary, FIGS. 4A and 4B illustrate a revealing raster, FIGS. 4C to 4E represent a succession of revealed images such as it may be observed with the aid of the combined image of FIG. 1 and of the revealing raster of FIG. 4A, when the observation conditions vary, FIG. 4F illustrates a detail of FIG. 4A, FIGS. 5A to 5C represent junction variants for joining between two adjacent blocks, FIG. 6A illustrates a variant revealing raster, FIGS. 6B to 6D represent a variant succession of revealed images such as it may be observed with the aid of the combined image of FIG. 1 and of the revealing raster of FIG. 6A when the observation conditions vary, FIG. 7A illustrates a variant revealing raster, FIGS. 7B to 7C represent a succession of revealed images such as it may be observed with the aid of the combined image of FIG. 1 and of the revealing raster of FIG. 7A when the observation conditions vary, FIGS. 8A and 8B represent variants of combined images, FIGS. 9A to 9H represent variants of revealing rasters, FIG. 10 illustrates revealed images such as they may be observed with the aid of the combined image of FIG. 1 and of a revealing raster, FIGS. 11A and 11B illustrate revealed images such as they may be observed with the aid of the combined image of FIG. 1 and of variants of revealing rasters, FIG. 12A illustrates the decomposition into interlaced images of a pattern of the combined image, FIG. 12B illustrates revealed images such as they may be observed with the aid of the combined image formed by the pattern of FIG. 12A and of a revealing raster, FIG. 13 represents in cross-section, in a schematic and partial manner, an exemplary secure item produced in accordance with an exemplary implementation of the invention, FIG. 14 illustrates the possibility of varying the inclination by deforming the secure item, FIGS. 15 and 16 represent two examples of secure items according to the invention, FIGS. 17A to 17D represent other examples of secure items according to the invention, in transverse section, in a schematic manner, FIGS. 18 and 19 illustrate variant embodiments of secure items according to the invention, in transverse section, in a schematic manner, FIG. 20 represents an exemplary embodiment of secure item according to the invention, the combined image or the revealing raster being carried by a window of the item, FIG. 21 represents the secure item folded, FIGS. 22 and 23 represent exemplary embodiments of secure item according to the invention, FIGS. 24 to 28 represent other exemplary embodiments of secure items according to the invention, the combined image and/or the revealing raster being carried by at least one security thread or a foil.

Figure 29A:
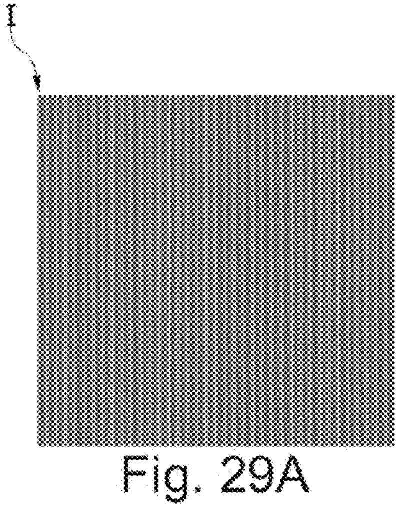
FIG. 29A represents another exemplary combined image.
Figure 29B:
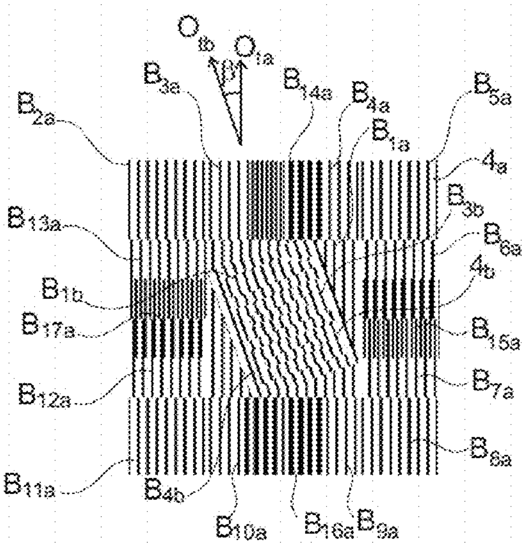
FIG. 29B represents a variant with two revealing rasters.
Figure 29C:
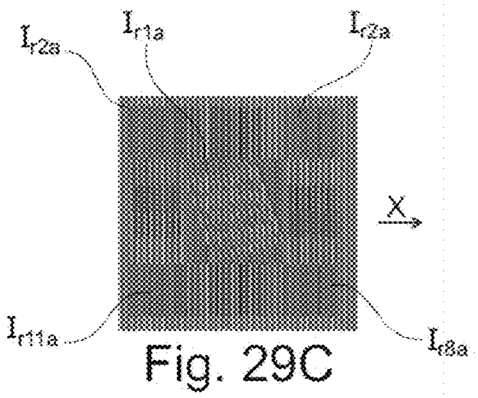
Figure 29F:
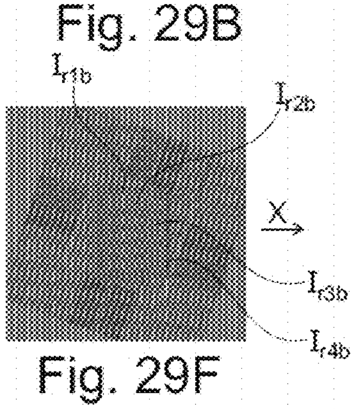
Figure 29D:
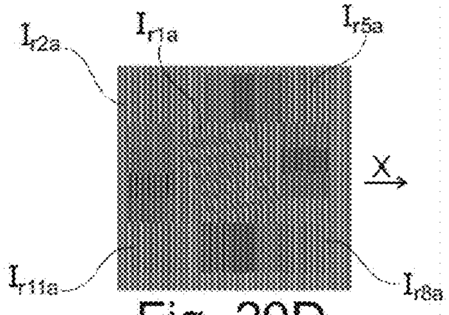
Figure 29G:
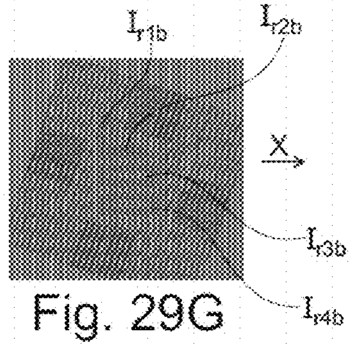
Figure 29E:
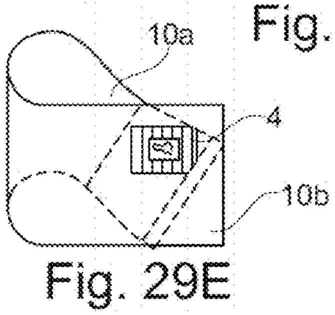
Figure 30:
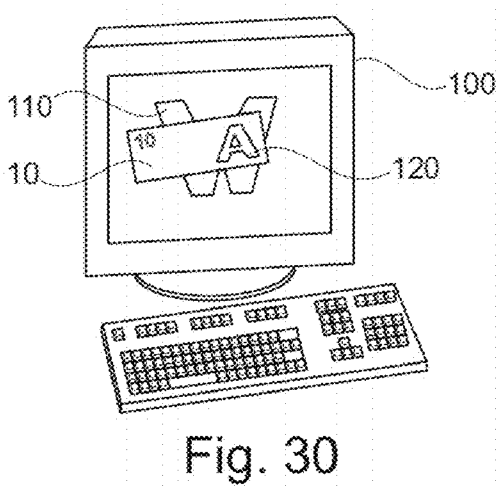
Figure 31:
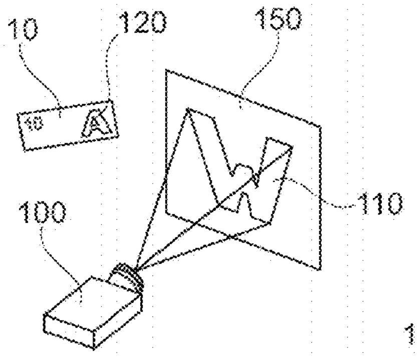
Figure 32:
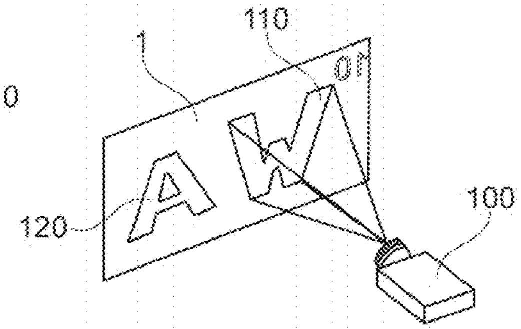
Figure 33:
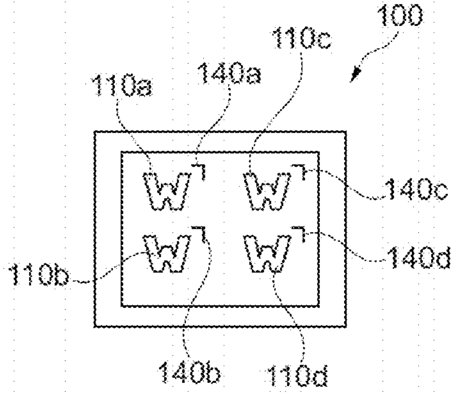
Figure 34:
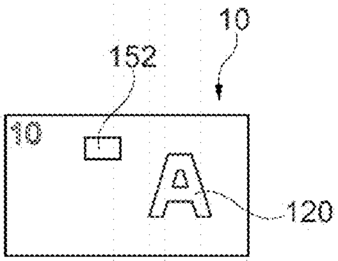
Figure 35:
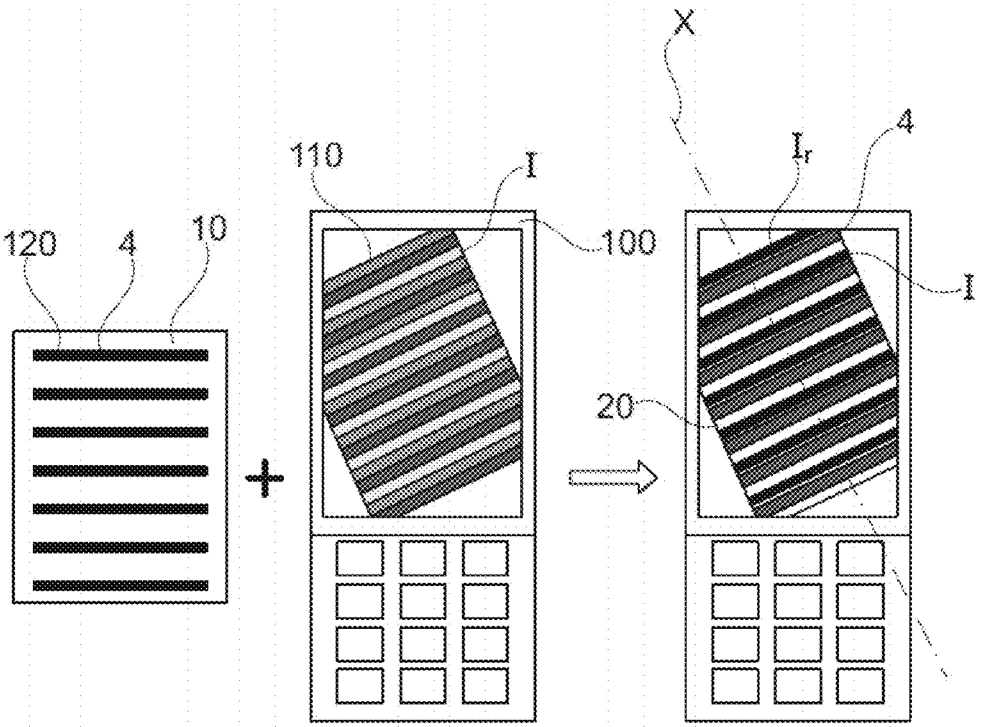
Figure 36A:
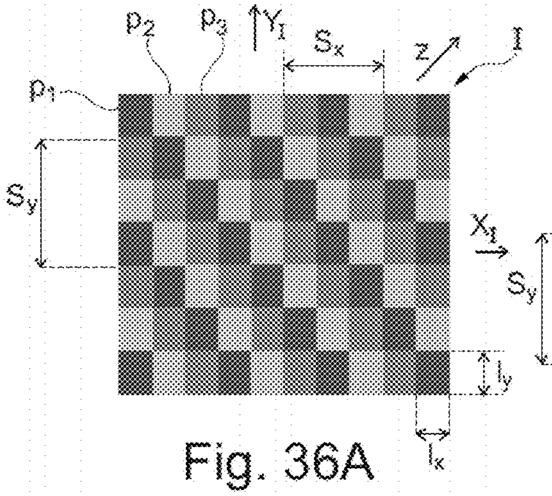
Figure 36B:
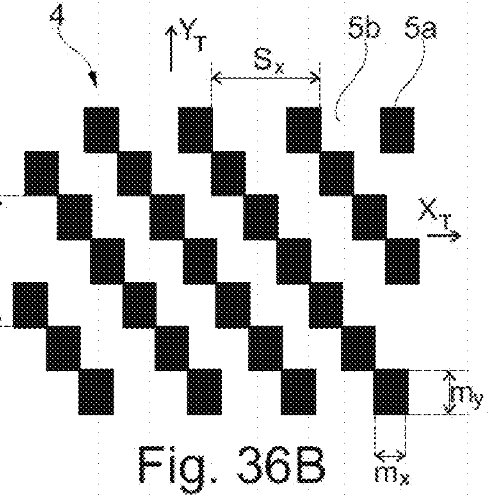
Figure 36C:
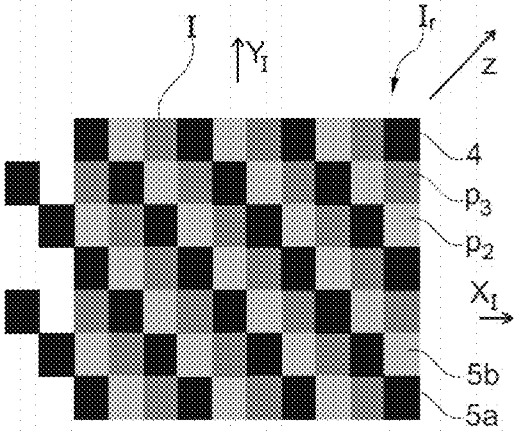
Figure 36D:
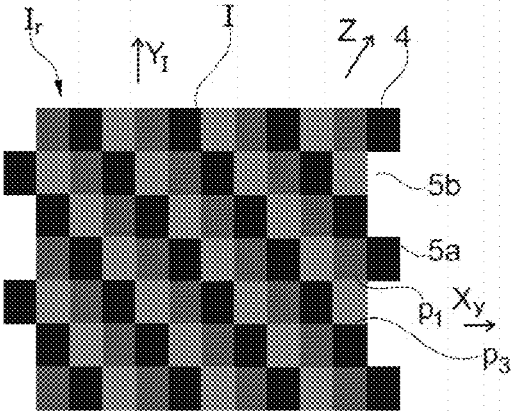
Figure 36E:
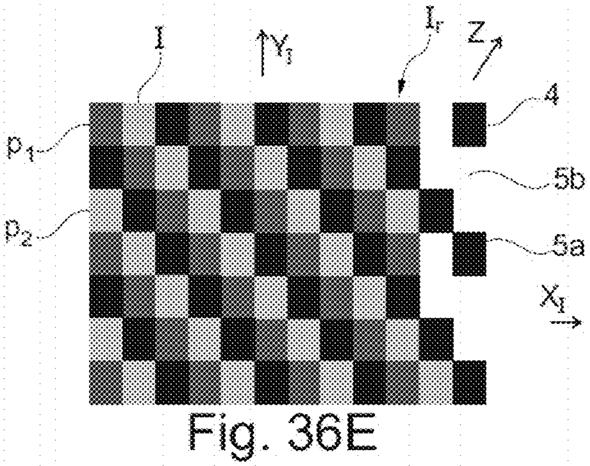
Figure 37A:
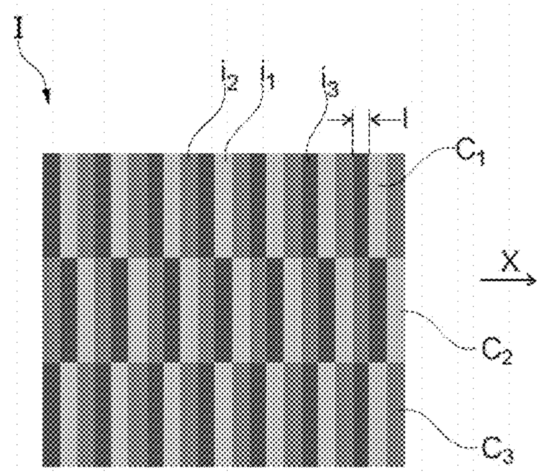
Figures 37B, 37C, 37D:
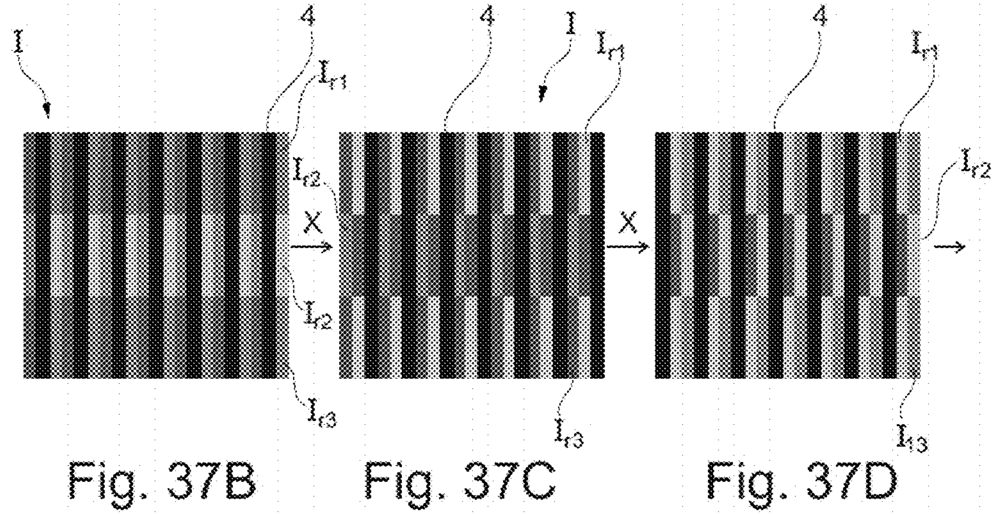

FIGS. 29C, 29D, 29F and 29G represent a succession of revealed images such as it may be observed with the aid of the combined image of FIG. 29A and of the revealing rasters of FIG. 29B when the observation conditions vary and the orientation of the rasters and of the combined image varies between a position illustrated in FIG. 29E and another position, FIGS. 30 to 32 represent variant assemblies comprising an electronic imager and an item, FIG. 33 represents a variant of first images formed by an electronic imager, FIG. 34 represents a variant item comprising an integrated microcircuit, FIG. 35 represents a variant assembly, the item comprising a second image in the form of a revealing raster and the electronic imager producing a first image in the form of a combined image, FIG. 36A represents another exemplary combined image, FIG. 36B represents a variant with a revealing raster in the form of pixels, FIGS. 36C to 36E represent a succession of revealed images such as it may be observed with the aid of the combined image of FIG. 36A and revealing rasters of FIG. 36B when the observation conditions vary and/or the relative position of the rasters and of the combined image varies, FIG. 37A illustrates a variant combined image, and FIGS. 37B to 37D represent a variant succession of revealed images such as it may be observed with the aid of the combined image of FIG. 37A and of a revealing raster when the observation conditions vary.

Combined Image

Figure 1:
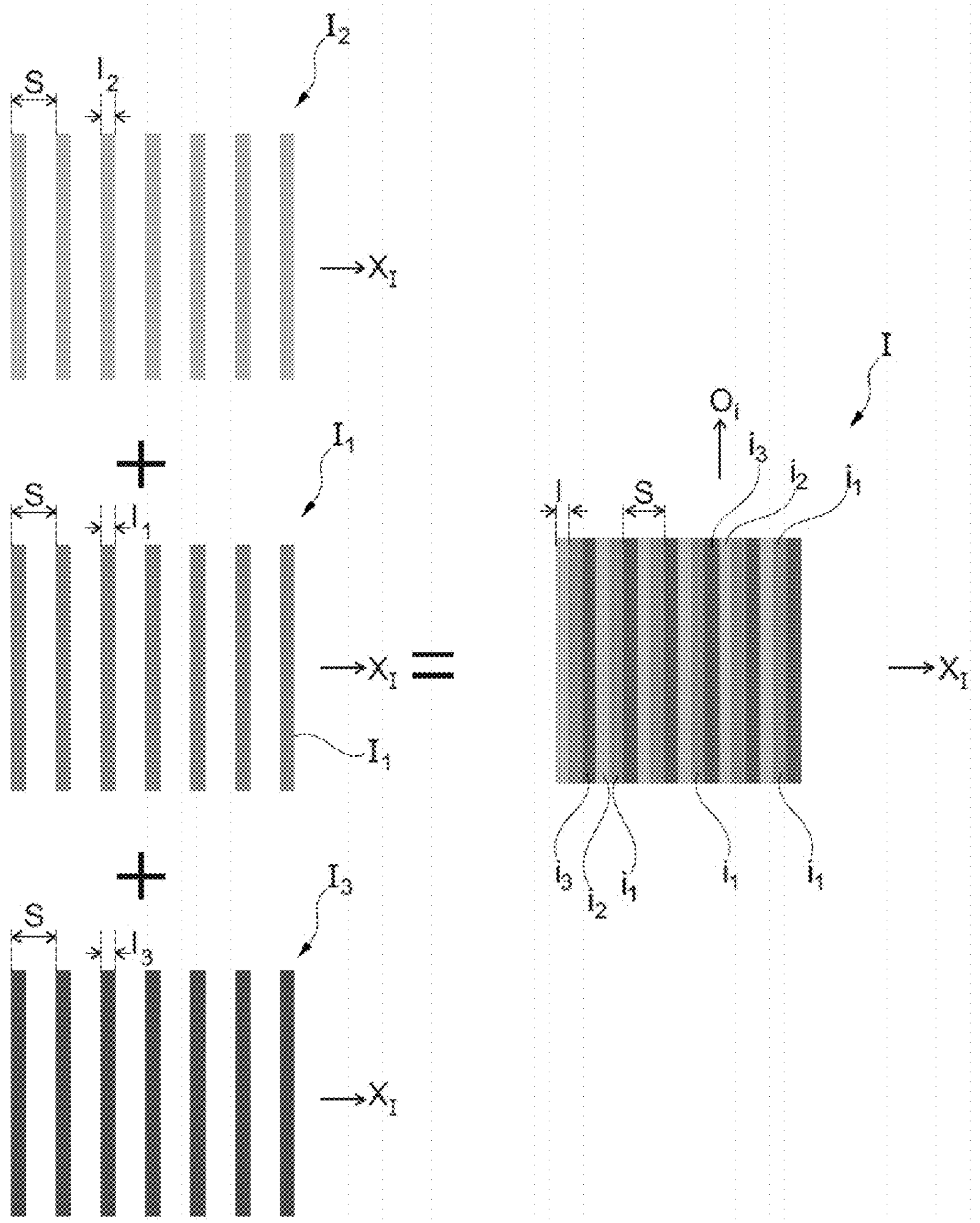

Illustrated in FIG. 1 is an example of forming a combined image I by adding together a plurality of interlaced images $I_1, I_2, \ldots, I_n$. Each interlaced image $I_i$ is formed of interlaced image lines $i_i$ arranged in a periodic manner in the direction $X_I$ and of like width $l_i$ constant over their entire length. The interlaced images are of like period S.

The interlaced image lines $i_i$ have parallel longitudinal axes defining a general orientation $O_i$ of the image combined by their general direction. The periodicity is observed along an axis $X_I$ perpendicular to the longitudinal axis of the interlaced image lines.

The lines of an interlaced image are continuous and of like length, but it may be otherwise.

The combined image I corresponds to the superposition of these interlaced images $I_1$ to $I_n$ while shifting them with respect to one another along the axis $X_I$ so that the interlaced image lines $i_1$ to $i_n$ are not superposed between the various images.

The widths $l_1$ to $l_n$ of the lines of the interlaced images $i_1$ to $i_n$ are such that the sum of the widths $l_1$ to $l_n$ of these lines $l_1$ to $i_n$ is less than or equal to the period S, and preferably, equal to the period S:

$$\sum_{j=1}^{n} lj = S$$

In the example illustrated, the lines of an interlaced image $i_1$ to $i_3$ are of like width $l_1$ to $l_3$ equal to S/3.

Figure 8A:
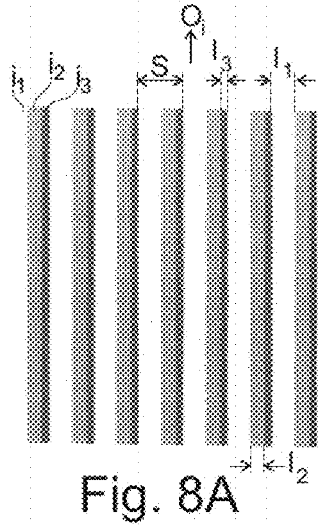

As a variant, the lines $i_1$ to $i_n$ of the interlaced images may be of widths $l_1$ to $l_n$ that differ with respect to one another, such as represented in FIG. 8A.

In the example of FIG. 1, the combined image I is formed of three interlaced images $I_1$ to $I_3$. The first interlaced image $I_1$ is formed of a periodic red line $i_1$, the second interlaced image $I_2$ is formed of a periodic green line $i_2$ and the third interlaced image $I_3$ is formed of a periodic blue line $i_3$. The three lines of the interlaced images $i_1$ to $i_3$ are of like width l. The lines of the interlaced images $i_1$ to $i_3$ are rectilinear. The resulting combined image I is a rasterized image exhibiting a periodic alternation of lines $i_1$ to $i_3$ of various colors.

The period S is between 10 μm and 1 mm, preferably between 50 and 200 μm.

The width l of the lines of the interlaced images $i_1$ to $i_n$ is less than or equal to 50 μm, being for example substantially equal to 33 μm. This value corresponds to a resolution of the combined image I of about 800 dpi, this representing a limit for conventional printers which generally have a maximum definition of 600 dpi, and which constitutes a security factor.

Moreover, the human eye not perceiving, at an observation distance of greater than or equal to 30 cm, details of less than approximately 100 μm, a sufficiently fine combined image appears of homogeneous aspect, for example substantially white here in transmitted light.

Hence, whatever the color or colors used for the combined image, the printing definition may be precise enough for the mixture of the colors to appear as homogeneous.

Figure 8B:
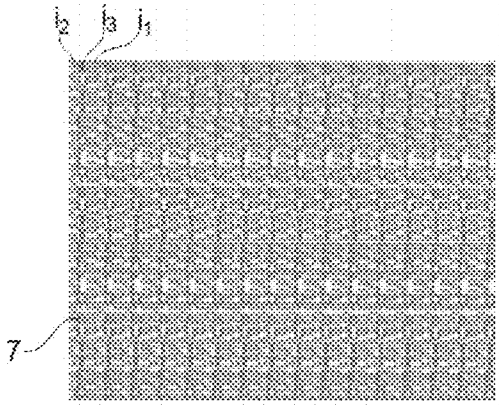

As a further variant illustrated in FIG. 8B, the lines of the interlaced images $i_1$ to $i_n$ comprise micropatterns 7, and better are formed by micropatterns 7. The micropatterns 7 of the lines $i_i$ of an interlaced image may be colored in a single color so that the lines $i_i$ appear colored, or not. Preferably, the micropatterns 7 are of the width l of the lines $i_i$ of the interlaced image and of a height of the same order of magnitude so that, in view of the resolution, the lines $i_i$ appear a homogeneous color to the eye, the micropatterns 7 not being distinguishable with the naked eye at 15 cm distance. The user must for example use a magnifying glass to view the micropatterns 7, thus strengthening the security of the item. The micropatterns 7 may be write-positive or write-negative.

In the example illustrated in FIG. 8B, the combined image I is formed of three interlaced images $I_1$, $I_2$ and $I_3$ such as described previously, except that the interlaced-image lines $i_1$, $i_2$ and $i_3$ are not lines of homogeneous color but lines of micropatterns 7 colored in write-positive. The lines w are formed of a repetition of the number "100" colored red, the lines $i_2$ are formed of a repetition of the word "AWS" colored green and the lines $i_3$ are formed of a repetition of the word "BUTTERFLY" colored blue.

The combined image I may be formed by printing, especially by four-color printing.

As a variant, the combined image I is formed by metallization and/or demetallization, especially by metallization with the aid of metals of different colors for each of the interlaced images $I_1$ to $I_n$. For example, the combined image I comprises two interlaced images $I_1$ and $I_2$, one being made of copper and the other of aluminum.

The interlaced images $I_1$ to $I_n$ may be glossy or matt. For example, the interlaced images are at least differentiated partially by their glossiness, some interlaced images being matt and other interlaced images being glossy.

As will be described hereinafter, the combined image I may also be formed by an electronic imager 100.

Revealing Raster

In the example illustrated in FIGS. 2A to 3C, the revealing raster 4 is composed of a periodic alternation of constant period Q of straight and occulting raster lines 5*a*, especially of black opaque lines, and of non-occulting lines 5*b*, especially of transparent lines having parallel longitudinal axes. The periodicity is observed along an axis $X_T$ perpendicular to the longitudinal axis of the raster lines 5*a* and 5*b*.

The longitudinal axes of the raster lines 5*a* and 5*b* define a general orientation of the raster $O_t$ by their general direction.

The opaque raster lines 5*a* are of a constant width m which is less than the period Q of the raster and the transparent raster lines 5*b* are of a constant width k which is less than the period Q.

The widths of the opaque raster lines 5*a* and of the transparent raster lines 5*b* may or may not be identical.

Figure 9A:
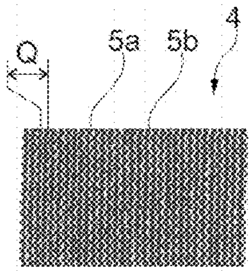
Figure 9B:
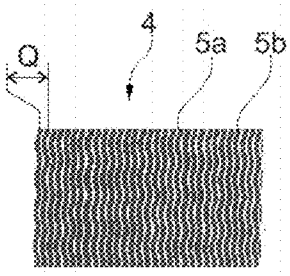
Figure 9C:
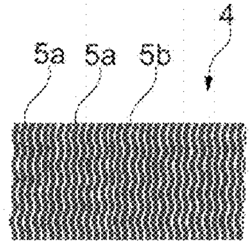
Figure 9D:
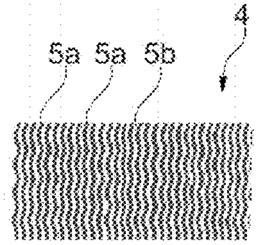
Figure 9E:
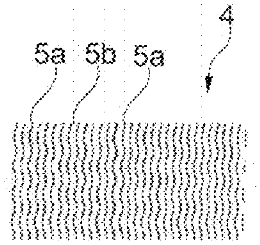
Figure 9F:
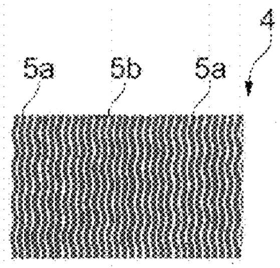
Figure 9G:
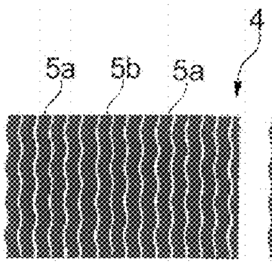
Figure 9H:
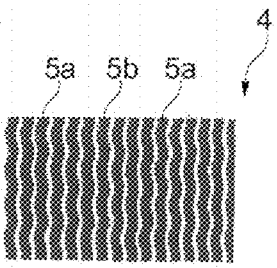

In the example illustrated, the raster lines 5*a* and 5*b* have rectilinear and parallel edges, but it may be otherwise. The revealing raster 4 may comprise other patterns such as crenellations or undulations, such as is illustrated respectively in FIGS. 9A and 9B.

The resolution of the revealing raster 4 is, preferably, greater than or equal to 800 dpi.

The revealing raster 4 may be as such of homogeneous aspect to the naked eye and at a normal observation distance, having regard to its fineness. In particular, the revealing raster may appear to the naked eye at 15 cm distance as having a uniform, gray color, which is darker or lighter according to the width m of the opaque raster line 5*a*.

A sufficiently fine combined image and a sufficiently fine revealing raster make it possible to afford anti-photocopy security.

The combined image I and/or the revealing raster 4 may be formed by printing, metallization, demetallization, laser marking, lithography or any other technique making it possible to fix or unveil an image.

To improve security, it is possible to use liquid-crystal inks, for example to print the combined image I. Animation, in order to be revealed, may then require in addition to the revealing raster, the use of a polarizer filter, which may or may not be present on the item.

The revealing raster 4 may be formed by printing or metallization and/or demetallization.

The opaque raster lines 5*a* of the revealing raster 4 may be glossy or matt.

As a variant, the revealing raster 4 is different, especially the raster lines are not opaque and transparent. The occulting raster lines may be formed of a filter not allowing the wavelengths corresponding to the combined image to pass through and the non-occulting raster lines may allow these wavelengths to pass through at least partially.

Revealed Image

The period Q of the revealing raster 4 is equal to the period S of the combined image I.

When the revealing raster 4 and the combined image I are superposed and the general orientation $O_t$ of the revealing raster 4 is substantially the same as the general orientation $O_i$ of the combined image I, a revealed image $I_r$ may be observed. The revealed image $I_r$ then corresponds to the parts of the combined image I that are present under the transparent raster lines 5*b* for a given angle of observation.

Indeed, when the revealing raster 4 and the combined image I are superposed, under the condition cited previously and when the revealed images are observed on the revealing raster side, the opaque raster lines 5*a* mask one part of the interlaced image lines $i_1$ to $i_n$, the other part of the interlaced image lines $i_1$ to $i_n$ being visible through the transparent raster lines 5*b*. The transparent raster lines 5*b* all allow the viewing of the same proportion ($P_1$; . . . ; $P_n$) of the interlaced image lines $i_1$ to $i_n$. The proportion $P_i$ corresponds to the proportion of a line $i_i$ of the interlaced image $I_i$ that is visible.

In the case where the superposition is observed on the combined image I side, the opaque raster lines 5$a$ render the interlaced image lines $i_1$ to $i_n$ on which they are superposed dark and therefore prevent them being viewed. Thus only the interlaced image lines $i_1$ to $i_n$ superposed on the transparent raster lines 4$b$ are visible to form the revealed image $I_r$.

Preferably, the revealed images $I_r$ are observable in reflected light and in transmitted light.

Figure 2A:
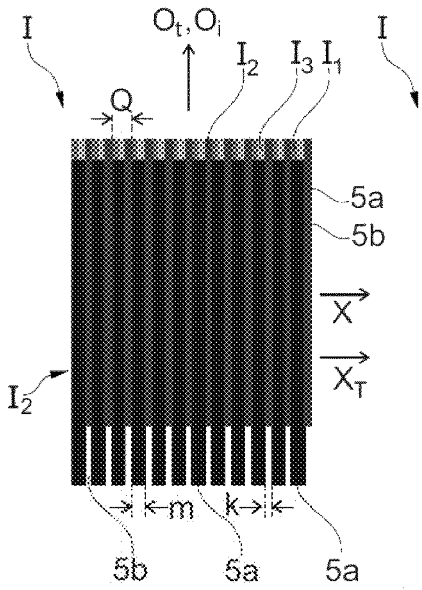
Figure 2B:
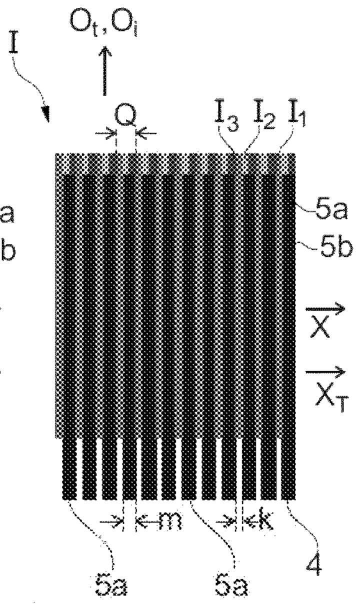
Figure 2C:
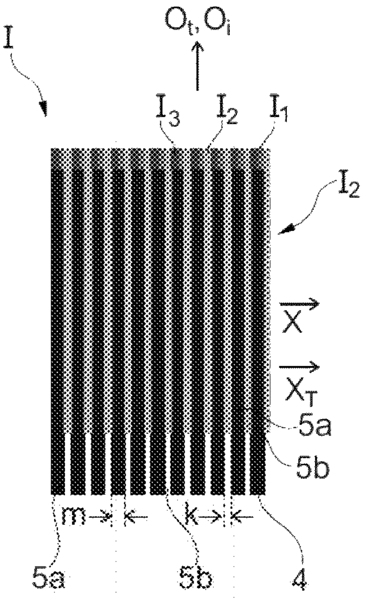

In the example of FIGS. 2A to 2C, the interlaced image lines $i_1$ to $i_n$ are all of the same width $l_1$ to $l_n$ and the opaque raster lines 5$a$ have a width m equal to twice the width of the interlaced image lines $i_1$ to $i_n$. Thus, the opaque raster lines 5$a$, when they are properly positioned with respect to the interlaced image lines $i_1$ to $i_n$, cover two interlaced images, i.e. two colors, and only one interlaced image, i.e. a single color, is visible. In the case of FIG. 2A, all of the blue is visible and all of the red and the green are hidden, the proportion ($P_1$; . . . ; $P_n$) of the interlaced image lines $i_1$ to $i_n$ of the revealed image $I_r$ is (0; 0; 1). Likewise for FIG. 2B, the proportion ($P_1$; . . . ; $P_n$) of the interlaced image lines $i_1$ to $i_n$ of the revealed image $I_r$ is (1; 0; 0) and for FIG. 2C, the proportion ($P_1$; . . . ; $P_n$) of the interlaced image lines $i_1$ to $i_n$ of the revealed image $I_r$ is (0; 1; 0).

Figure 3A:
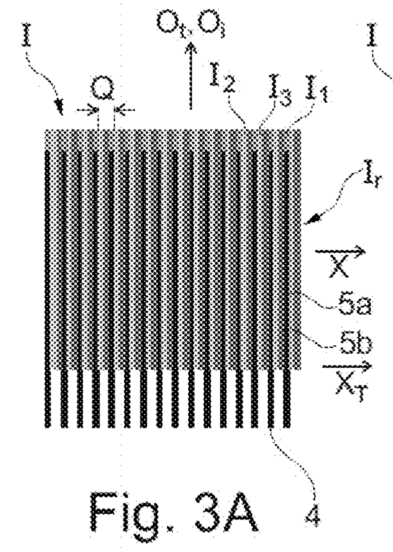
Figure 3B:
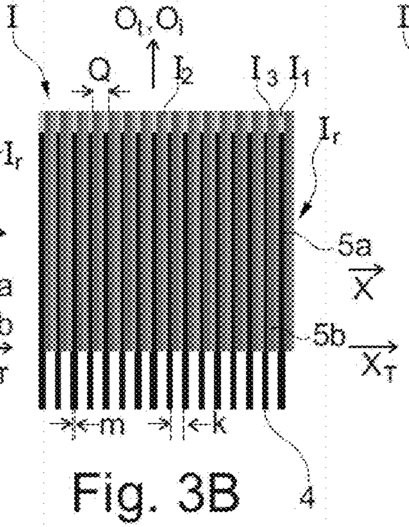
Figure 3C:
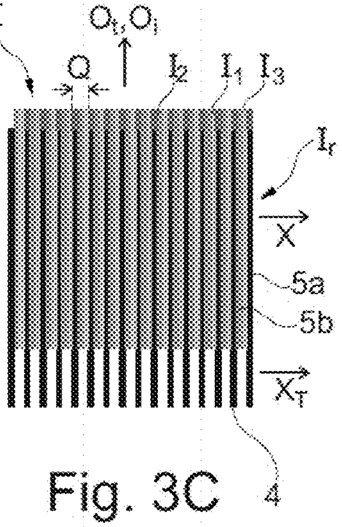

As a variant, in the example of FIGS. 3A to 3C, the interlaced image lines $i_1$ to $i_n$ are all of the same width $l_1$ to $l_n$ and the opaque raster lines 5$a$ have a width m equal to 0.75 times the width of the interlaced image lines $i_1$ to $i_n$. Thus, the opaque raster lines 5$a$, when they are properly positioned with respect to the interlaced image lines $i_1$ to $i_n$, cover three-quarters of one of the interlaced images, i.e. three-quarters of a color, two interlaced images and a quarter of the third interlaced image are therefore visible. In the case of FIG. 3A, all of the blue and the green and a quarter of the red are visible and three-quarters of the red is hidden, the proportion ($P_1$; $P_2$; $P_3$) of the interlaced image lines $i_1$, $i_2$ and $i_3$ of the revealed image $I_r$ is (0.25; 1; 1). Likewise for FIG. 3B, the proportion ($P_1$; $P_2$; $P_3$) of the interlaced image lines $i_1$, $i_2$ and $i_3$ of the revealed image $I_r$ is (1; 0.25; 1) and for FIG. 3C, the proportion ($P_1$; $P_2$; $P_3$) of the interlaced image lines $i_1$, $i_2$ and $i_3$ of the revealed image $I_r$ is (1; 1; 0.25).

The revealed image $I_r$ may appear homogeneous to the naked eye. In the case of a combined image I in the form of a colored raster formed of an alternation of red, green and blue lines of identical widths l and of a revealing raster of width of a transparent raster line k, it is possible to determine the color of the revealed image $I_r$ in RGB coordinates on the basis of the proportion ($P_R$, $P_G$, $P_B$). The RGB coordinates take the form of three numbers lying between 0 and 255 characterizing said color, each number representing the proportion of one of the components red, green and blue making it possible to obtain said color.

The components have coordinates:

$R=R_{max}*P_R$, $G=G_{max}*P_G$, and $B=B_{max}*P_B$, with $$R_{max}=G_{max}=B_{max}=255*k/s$$

It is thus possible to determine the color of the image revealed as a function of the width k of the transparent raster lines 5$b$ and of the proportion ($P_R$, $P_G$, $P_B$) of the interlaced images $I_1$, $I_2$ and $I_3$. The revealed image Ir is observable in transmitted light or in reflected light at one and the same time on the revealing raster 4 side and on the combined image I side when the revealing raster 4 and the combined image I are superposed.

In the variant illustrated in FIG. 36A, the combined image I comprises a periodic alternation of interlaced-image pixels $p_1$ to $p_n$ in two directions $X_I$ and $Y_I$. The interlaced-image pixels $p_1$ to $p_n$ are of rectangular shape but it could be otherwise. For example the pixels could be of another polygonal shape, especially square, hexagon or lozenge.

The pixels of FIG. 36A may also be seen as diagonal interlaced image lines formed of pixels joined together by one of their corners alternating periodically in the direction Z.

The preceding description, given for lines, applies to the pixels. Thus, the pixels $p_1$ to $p_n$ belonging to different interlaced images exhibit a different aspect, especially a different hue, saturation, glossiness, transparency, luminescence. For example the pixels $p_1$ to $p_n$ belonging to different interlaced images are of different colors, especially red, green and blue.

The combined image I exhibits a period $S_X$ in the direction $X_I$ and a period $S_Y$ in the direction $Y_I$. Here, the directions $X_I$ and $Y_I$ are perpendicular but it could be otherwise. The directions $X_I$ and $Y_I$ could form a non-zero angle, different from 90°, between themselves.

The interlaced-image pixels $p_1$ to $p_n$ exhibit a dimension $l_X$ and a dimension $l_Y$ in respectively the directions $X_I$ and $Y_I$. The dimensions $l_X$ and $l_Y$ are each such as described previously for the interlaced image lines $i_1$ to $i_n$.

The revealing raster 4 is according to FIG. 36B. It exhibits a periodic alternation of opaque raster pixels 5$a$ in two directions $X_T$ and $Y_T$ forming between themselves the same angle as the directions $X_I$ and $Y_I$. The opaque raster pixels 5$a$ are separated from one another by transparent gaps 5$b$ and repeat according to the periods $S_X$ and $S_Y$ of the combined image in the respective directions $X_T$ and $Y_T$.

The pixels of the revealing raster may be of a dimension $m_X$ and of a dimension $m_Y$ in the respective directions $X_T$ and $Y_T$ which are less than the periods $S_X$ and $S_Y$ respectively.

In the example illustrated, the dimension $m_X$ in the direction $X_T$ is equal to the dimension $l_X$ of the interlaced-image pixels $p_1$ to $p_n$ and the dimension $m_Y$ in the direction $Y_T$ is equal to the dimension $l_Y$ of the interlaced-image pixels $p_1$ to $p_n$.

The dimensions $m_X$ and $m_Y$ may be different respectively from $l_X$ and $l_Y$ on condition that the periods in the directions X and Y are the same.

Upon superposing the revealing raster 4 and the combined image I so that the directions $X_T$ and $X_I$ coincide and that the directions $Y_T$ and $Y_I$ coincide, the revealing raster makes it possible to observe revealed images $I_r$ such as are represented in FIGS. 36C to 36E.

In the example illustrated the opaque raster pixels 5$a$ hide one of the interlaced images $I_1$ to $I_n$ so that two of the interlaced images are visible. In FIG. 36C, the revealed image $I_r$ is formed of the green and red interlaced images, in FIG. 36D, the revealed image $I_r$ is formed of the blue and red interlaced images and in FIG. 36E, the revealed image $I_r$ is formed of the blue and green interlaced images.

The various revealed images $I_r$ illustrated may be obtained by displacing the revealing raster 4 with respect to the combined image in the direction $X_I$, the direction $Y_I$ or the direction Z and/or by changing the angle of view around the directions $X_I$ and $Y_I$ or Z.

Observation of a Change of the Revealed Image

It is possible to vary the revealed image $I_r$ observed by changing the conditions of observation of the superposed revealing raster 4 and combined image I, and especially, as is detailed hereinafter, by changing the angle of observation and/or by displacing the revealing raster 4 with respect to the combined image I. Thus, virtually or really, by displacing the combined image I with respect to the revealing raster 4 in a direction X perpendicular to the general orientation of the combined image I and of the revealing raster 4, the revealed image $I_r$ varies.

Thus, by changing the observation conditions, it is possible to pass from FIG. 2A to FIG. 2B and to FIG. 2C. The same holds for FIGS. 3A to 3C.

By varying the observation conditions, the user may then see a change of the revealed image $I_r$ and conclude in view of this observation as to the authenticity of the item.

Blocks

Figure 4A:
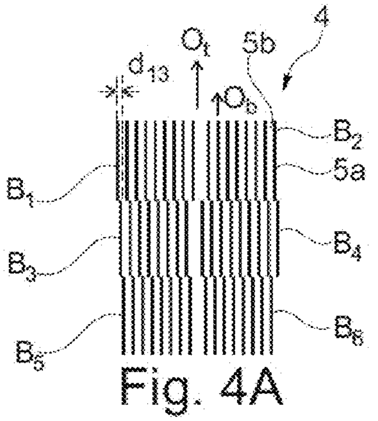
Figure 6A:
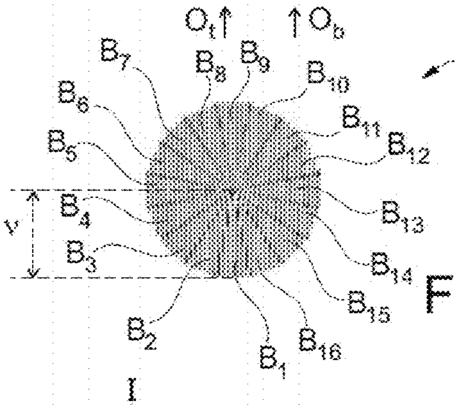
Figure 7A:
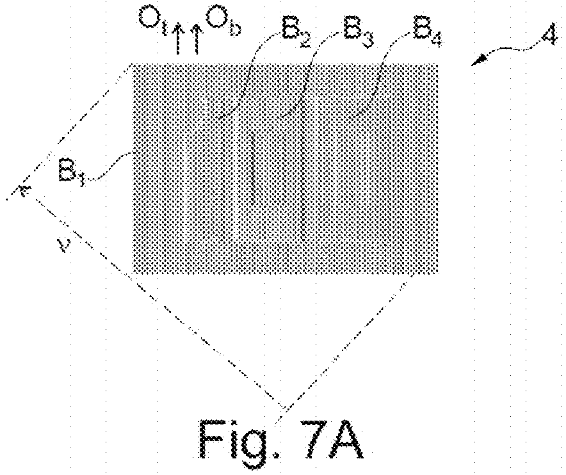

As illustrated in FIGS. 4A, 6A and 7A, the revealing raster 4 may be formed of a plurality g of raster blocks $B_1$ to $B_g$. Each raster block $B_i$ is such as described for the revealing raster 4 in conjunction with FIGS. 2A to 3C and makes it possible to reveal, when the revealing raster is superposed with the combined image I such as described previously and its orientation is the same, a revealed image $I_{r1}$ to $I_{rg}$.

The blocks $B_1$ to $B_g$ of the revealing raster 4 are superposed with the same combined image I.

Preferably, as illustrated, the blocks $B_1$ to $B_g$ of one and the same raster are of the same period Q and of the same general orientation $O_b$. The general orientations $O_b$ of the blocks 10 define a general raster orientation $O_r$.

The blocks $B_1$ to $B_g$ exhibit a maximum dimension v of between 1.4 and 42 mm and an area equaling between 0.2 and 90% of the area of the revealing raster.

In the examples illustrated in FIGS. 4A, 6A and 7A, the blocks $B_1$ to $B_g$ exhibit opaque raster lines 5*a* of like width m and at least two of the blocks $B_1$ and $B_j$ are mutually phase-shifted, that is to say exhibit a non-zero phase shift distance $d_{ij}$ of less than the period Q, the phase shift distance $d_{ij}$ being defined as the remainder of the division of the distance $c_{ij}$ between the longitudinal axis of a raster line $i_i$ of the block $B_i$ and the longitudinal axis of the consecutive raster line $i_j$ of the block $B_j$ by the period Q.

$$d_{ij}=\text{remainder}(c_{ij}/Q)$$

When the revealing raster 4 is observed so that its general orientation $O_t$ is vertical, at least one part of the opaque raster lines of a block $B_i$ may be above and/or alongside at least one part of the opaque raster lines of another block $B_j$.

Thus, when the revealing raster is superposed with the combined image and exhibits the same general orientation, the transparent raster lines 5*b* of the block $B_i$ do not unveil the same proportion of the interlaced images ($P_1$; . . . ; $P_n$) as that of the block $B_j$ and therefore the images revealed $I_{ri}$ and $I_{rj}$ respectively by the blocks $B_1$ and $B_j$ are of different aspects since they do not exhibit the same proportion ($P_1$; . . . ; $P_n$) of the interlaced images. In the case illustrated of a rasterized and colored combined image, for example with red, green and blue lines, the revealed images $I_{r1}$ to $I_{rg}$ of the mutually phase-shifted blocks are of different colors.

Preferably, the revealing raster 4 is continuous and each of the blocks $B_1$ to $B_g$ exhibits a part of its contour in common with another of the blocks $B_1$ to $B_g$.

The revealed images $I_{r1}$ to $I_{rg}$ may form a pattern, especially a text, an alphanumeric sign, an ideogram, a geometric shape, an object, a person and/or an animal, for example reproduce a pattern present elsewhere on the secure item.

By changing the conditions of observation of the superposed revealing raster 4 and combined image I, especially, as is detailed hereinafter, by changing the angle of observation and/or by displacing the revealing raster 4 with respect to the combined image I, the images revealed $I_{r1}$ to $I_{rg}$ by the various blocks $B_1$ to $B_g$ may vary. This change of aspect may give an impression of motion or may vary the color of a pattern.

FIGS. 4C to 4E, 6B to 6D and 7B to 7C illustrate examples of revealing rasters 4 formed of blocks $B_1$ to $B_g$ superposed with a combined image.

In these examples, the revealing raster 4 is superposed with a combined image I formed of three interlaced images respectively colored red, green and blue, such as described previously.

Figure 4B:
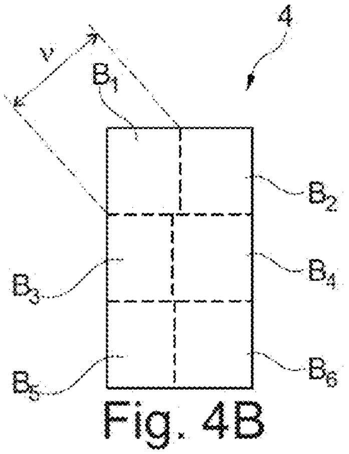

In the example illustrated in FIGS. 4A to 4E, the revealing raster 4 comprises six rectangular blocks $B_1$ to $B_6$ each forming about ⅙th of a rectangle, as is visible in FIG. 4B. Each of the blocks $B_1$ to $B_6$ exhibits a contour that is common with at least two other blocks $B_1$ to $B_6$. The area of each block $B_1$ to $B_6$ is substantially between 20% and 15% of the area of the revealing raster 4.

The blocks $B_1$, $B_2$ and $B_3$ are mutually phase-shifted and the block $B_4$ is not phase-shifted with respect to the block $B_1$, the block $B_5$ is not phase-shifted with respect to the block $B_2$ and the block $B_6$ is not phase-shifted with respect to the block $B_3$ so that each of the blocks $B_1$ to $B_6$ is phase-shifted with respect to the blocks $B_1$ to $B_6$ that are adjacent to it.

Figure 4C:
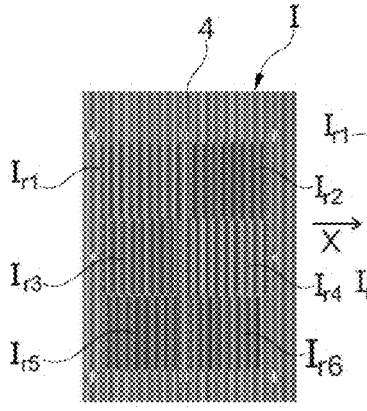
Figure 4D:
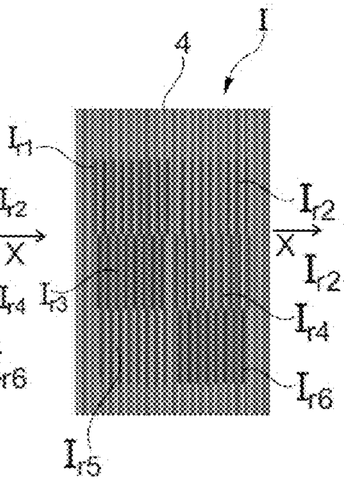
Figure 4E:
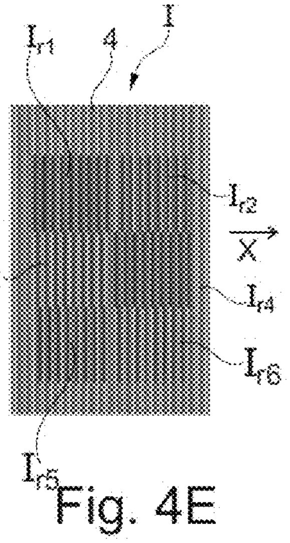
Figure 4F:
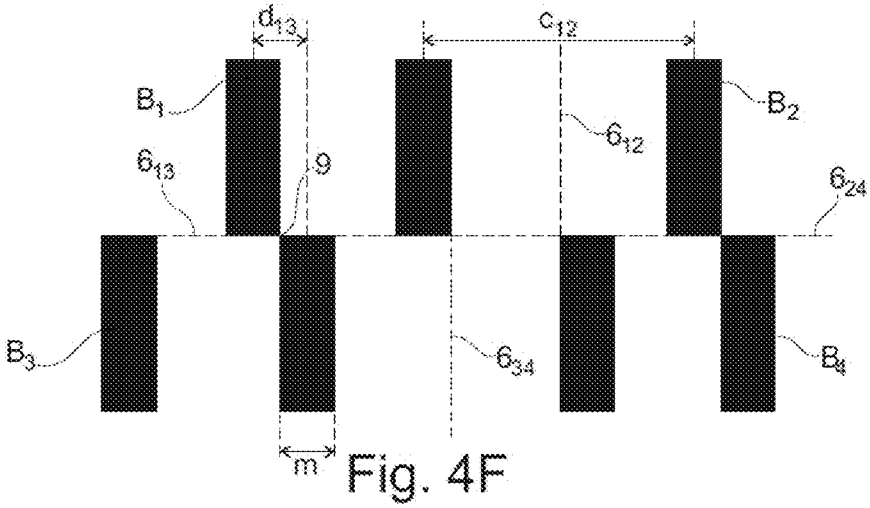

As visible in FIG. 4F representing the joining of the blocks $B_1$, $B_2$, $B_3$ and $B_4$, when the general orientation $O_t$ of the revealing raster is oriented vertically, the blocks $B_1$ and $B_3$ are arranged one above the other and have an edge $\mathbf{6}_{13}$, represented by dashes, in common whilst the blocks $B_1$ and $B_2$ are arranged one alongside the other with an edge $\mathbf{6}_{12}$ in common.

The opaque raster lines of the block $B_1$ have a corner 9 in common with the opaque raster lines of the block $B_3$. The same holds with the blocks $B_3$ and $B_5$, $B_2$ and $B_4$, and $B_4$ and $B_6$. As illustrated in FIG. 4F, the block $B_1$ is phase-shifted from the block $B_3$ by a phase shift distance du equal to the width m of an opaque raster line. The same holds with the blocks $B_3$ and $B_5$, $B_2$ and $B_4$, and $B_4$ and $B_6$. The distance cm between the last opaque raster line of the block $B_1$ and the consecutive opaque raster line of the block $B_2$ is equal to five times the width m of an opaque raster line. As the period Q is equal to three times the length m, the block $B_1$ is phase-shifted from the block $B_2$ by a phase shift distance $d_{12}$ equal to twice the width m of an opaque raster line. The same holds with the blocks $B_3$ and $B_4$, and $B_5$ and $B_6$. The width m of the opaque raster line 5*a* is equal to the width l of an interlaced image line so that the transparent raster line may reveal two interlaced images.

The revealed images $I_{r1}$, $I_{r2}$ and $I_{r3}$ are phase-shifted and the respective revealed images $I_{r1}$ and $I_{r4}$, $I_{r2}$ and $I_{r5}$ and $I_{r3}$ and $I_{r6}$ are identical. The revealed images $I_{r1}$ to $I_{r6}$ form a rectangle composed of 6 squares each formed by a revealed image $I_{r1}$ to $I_{r6}$, each square neighboring squares of different colors. Thus, as illustrated in FIG. 4B, if the interlaced image $I_{r1}$ exhibits interlaced image proportions (1; 1; 0), thus corresponding to an RGB color (170, 170, 0), then the interlaced image $I_{r2}$ exhibits proportions (1; 0; 1), thus corresponding to an RGB color (170, 0, 170), and the interlaced image $I_{r3}$ exhibits proportions (0; 1; 1), thus corresponding to an RGB color (0, 170, 170).

FIGS. 4C to 4E represent images revealed $I_{r1}$ to $I_{r6}$ under different observation conditions.

By changing the observation conditions, it is possible to pass from FIG. 4C to FIG. 4D and to FIG. 4E, thus giving the user the impression that the blocks of colors rotate mutually clockwise, especially that $I_{r1}$ takes the place of $I_{r2}$ which takes the place of $I_{r4}$ which takes the place of $I_{r6}$ and so on and so forth.

In the example illustrated in FIGS. 4A to 4F, the blocks $B_1$ to $B_g$ are distinct legions of the revealing raster 4 which do not intersect. It may be otherwise in particular on account of the manufacturing tolerances. The blocks $B_1$ to $B_g$ may be in regions of the revealing raster 4 that intersect over less than 5% of the area of the revealing raster.

Figure 5A:
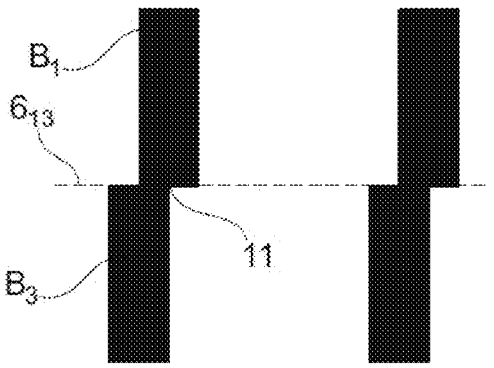
Figure 5B:
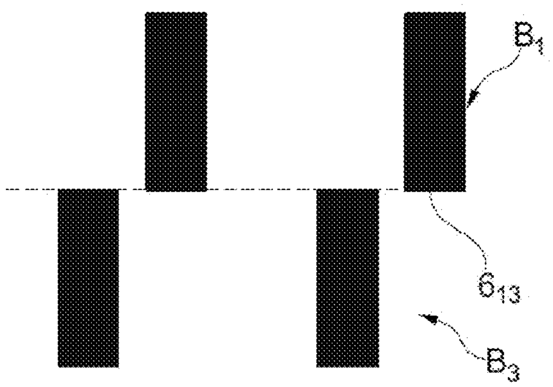

As a variant illustrated in FIG. 5A, the opaque raster lines of the block $B_1$ have a zone 11 in common with the opaque raster lines of the block $B_3$. As a further variant illustrated in FIG. 5B, the opaque raster lines of the block $B_1$ are disjoint from the opaque raster lines of the block $B_3$.

Figure 5C:
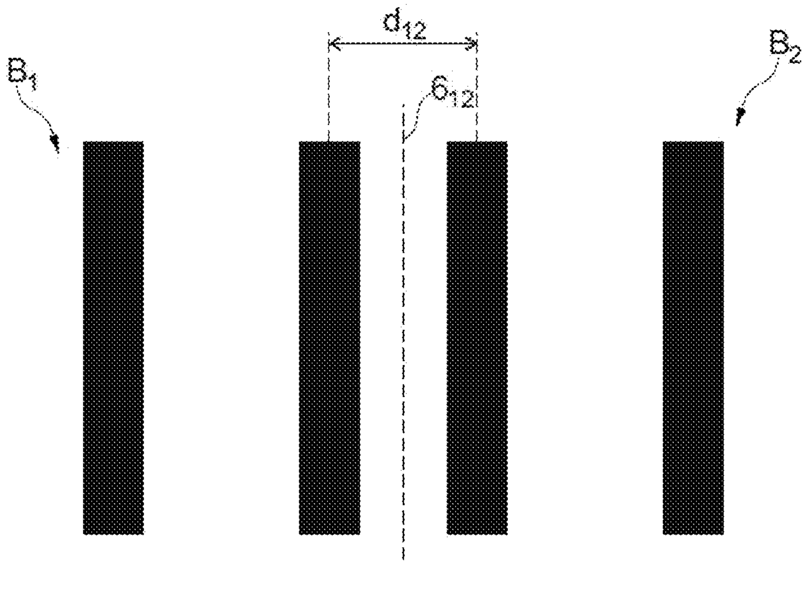

As a variant illustrated in FIG. 5C, the distance $c_{12}$ between the last opaque raster line of the block $B_1$ and the consecutive opaque raster line of the block $B_2$ is equal to twice the width m of an opaque raster line.

In the example illustrated in FIGS. 6A to 6D, the revealing raster 4 comprises sixteen blocks $B_1$ to $B_{16}$ each forming a sector of a disk. Each block $B_1$ to $B_{16}$ is adjacent to two blocks and all the blocks $B_1$ to $B_{16}$ join together at the center of the disk.

The blocks $B_1$, $B_2$, $B_3$ and $B_4$ are mutually phase-shifted and the blocks $B_5$, $B_9$ and $B_{13}$ are not phase-shifted with respect to the block $B_1$, the blocks $B_6$, $B_{10}$ and $B_{14}$ are not phase-shifted with respect to the block $B_2$, the blocks $B_8$, $B_{12}$ and $B_{15}$ are not phase-shifted with respect to the block $B_3$ and the blocks $B_8$, $B_{12}$ and $B_{16}$ are not phase-shifted with respect to the block $B_4$ so that each of the blocks $B_1$ to $B_{16}$ is phase-shifted with respect to the three blocks $B_1$ to $B_{16}$ which follow it and which precede it when it is rotated clockwise.

The opaque-raster lines 5*a* have a width m substantially equal to three-quarters of the width l of the interlaced-image lines.

The block $B_1$ is phase-shifted from the block $B_2$ by a distance $d_{12}$ equal to three-quarters of the width l of an interlaced image line $i_1$ to $i_4$, the block $B_1$ is phase-shifted from the block $B_3$ by a distance $d_{13}$ equal to three-halves of the width l of an interlaced image line $i_1$ to $i_4$ and the block $B_1$ is phase-shifted from the block $B_4$ by a distance du equal to nine-quarters of the width l of an interlaced image line $i_1$ to $i_4$.

The revealed images $I_{r1}$ to $I_{r16}$ form a disk composed of 16 sectors each formed by a revealed image $I_{r1}$ to $I_{r16}$, each sector being situated between sectors of different colors. Thus, as illustrated in FIG. 6B, if the interlaced image $I_{r1}$ exhibits interlaced image proportions (1; 0.25; 1), i.e. an RGB color of about (191, 48, 191), then the interlaced image $I_{r2}$ exhibits proportions (0.5; 0.75; 1), i.e. an RGB color of about (95, 143, 191), the interlaced image $I_{r3}$ exhibits proportions (0.5; 1; 0.75), i.e. an RGB color of about (95, 191, 143) and the interlaced image $I_{r4}$ exhibits proportions (1; 1; 0.25), i.e. an RGB color of about (191, 191, 48).

Figure 6B:
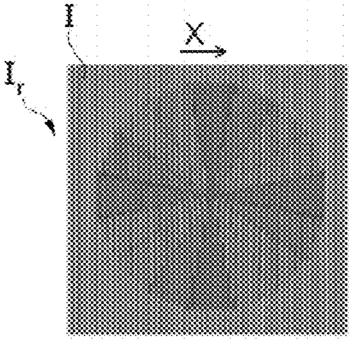
Figure 6C:
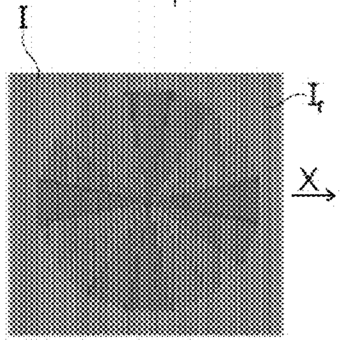
Figure 6D:
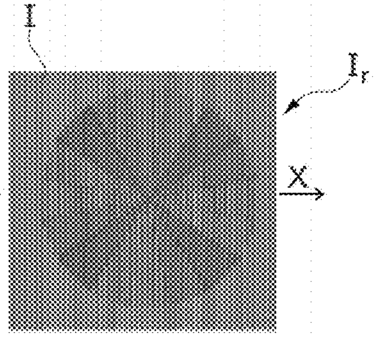

FIGS. 6B to 6D represent images revealed $I_{r1}$ to $I_{r16}$ under different observation conditions.

Thus, by changing the observation conditions, it is possible to pass from FIG. 6B to FIG. 6C and to FIG. 6D, thus giving the user the impression that the blocks of colors are rotating clockwise.

Figure 7B:
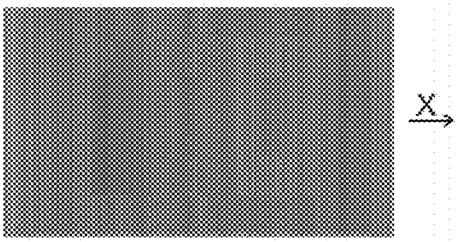
Figure 7C:
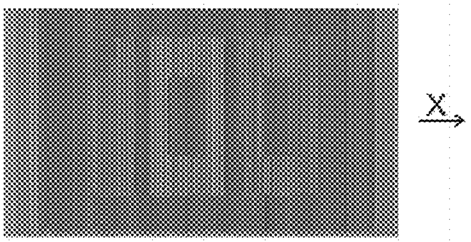

In the example illustrated in FIGS. 7A to 7C, the revealing raster 4 comprises four blocks $B_1$ to $B_4$ of various shapes. The block $B_2$ represents the digit 1, the blocks $B_3$ and $B_4$ represent the digit 0 and the block $B_1$ is a rectangular block in which the other blocks are inserted. All the blocks $B_1$ to $B_4$ are mutually phase-shifted.

The images are schematic for illustration purposes, however during the observation of the revealing raster alone illustrated in FIG. 7A, the pattern "100" is not distinguishable at a normal observation distance, of between 30 cm and 10 cm and preferably 15 cm.

The opaque raster lines 5*a* have a width m substantially equal to three-quarters of the width l of the interlaced image lines just as in the example of FIGS. 6A to 6D.

The revealed images $I_{r1}$ to $I_{r4}$ form the number 100 on a colored background, the colors of all the digits being different.

FIGS. 7B to 7C represent images revealed $I_{r1}$ to $I_{r4}$ under different observation conditions.

Thus, by changing the observation conditions, it is possible to pass from FIG. 7B to FIG. 7C and to observe a change of color of the number 100.

Figure 10:
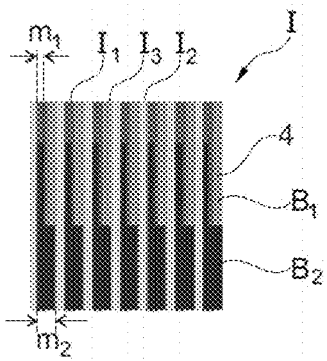

In the variant illustrated in FIG. 10, at least two blocks $B_i$ and $B_j$ have opaque raster lines of different respective widths $m_i$ and $m_j$. Thus, when the revealing raster is superposed with the combined image so that its general orientation is the same, the transparent raster lines 5*b* of the block $B_i$ do not unveil the same proportion of the interlaced image lines ($P_1$; . . . ; $P_n$) as that of the block $B_j$ and therefore the images revealed $I_{ri}$ and $I_{rj}$ respectively by the blocks $B_i$ and $B_j$ do not exhibit the same proportion ($P_1$; . . . ; $P_n$) of interlaced images. In the case illustrated of a rasterized and colored combined image, for example with red, green and blue lines, the revealed images $I_{r1}$ to $I_{rg}$ of the blocks of widths $m_1$ to $m_g$ are of different colors.

Figure 11A:
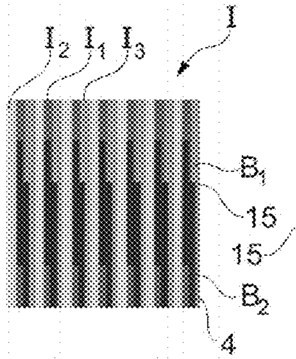
Figure 11B:
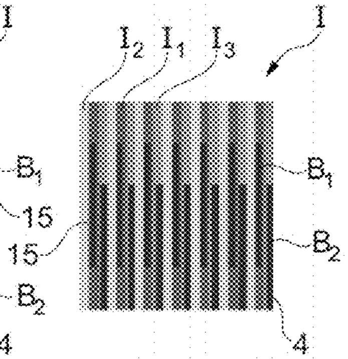

In the variant illustrated in FIGS. 11A and 11B, two blocks $B_i$ and $B_j$ of one and the same revealing raster 4 are at least partially superposed. Their superposition defines a sub-block 15 having the form of a raster formed by the interleaving of the raster lines 5*a* and 5*b* of the blocks $B_i$ and $B_j$. The raster of the sub-block 15 may exhibit:

(i) as illustrated in FIG. 11A, when the opaque raster lines 5*a* of the blocks $B_i$ and $B_j$ are superposed or have an edge in common, a periodic alternation of period Q of an opaque raster line 15*a* and of a transparent raster line 15*b*, the opaque raster line having a thickness greater than or equal to that of the raster lines of each of the blocks of which it is formed, or (ii) as illustrated in FIG. 11B, when the opaque raster lines 5*a* of the blocks $B_i$ and $B_j$ are disjoint, a periodic alternation of period Q of four alternately opaque 15*a* and transparent 15*b* raster lines.

Each sub-block 15 allows the observation of a revealed image $I_r$ by superposition with the combined image. In the case (i), the revealed image is of the same shape as for a block having an opaque raster line of the same width and in the case of the image ($i_i$), the revealed image obtained depends on the position and on the width of the raster lines 15*a* and 15*b*.

Figure 12A:
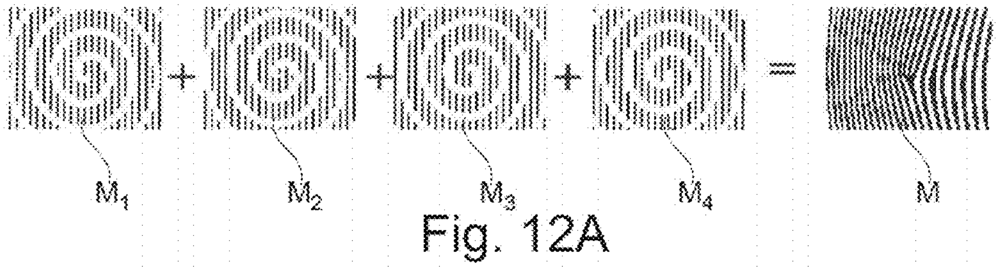
Figure 12B:
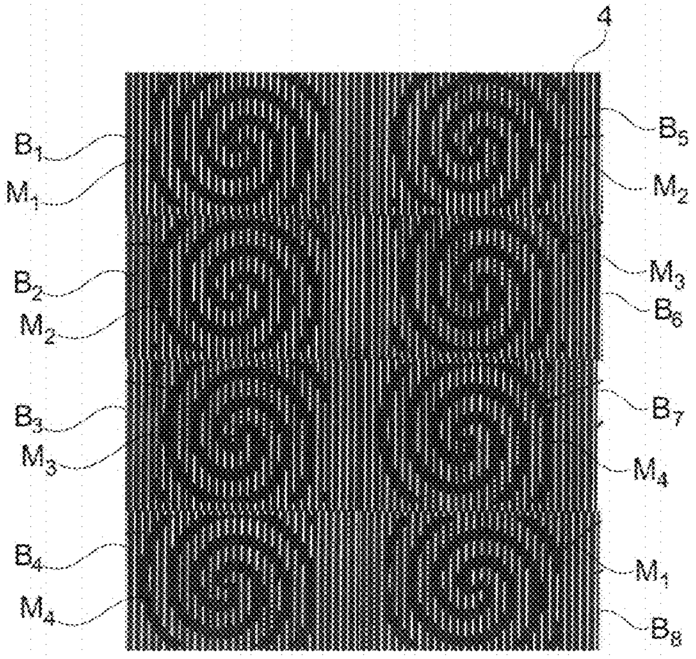

As a further variant, such as illustrated in FIGS. 12A and 12B, each interlaced image $I_1$, $I_2$, . . . , $I_n$ forms a periodic, for example such as represented in FIG. 12A, pattern and the transparent raster lines 5*b* are of width k equal to the width l of an interlaced image line. Thus, the image revealed by each block $B_1$ to $B_g$ corresponds to one of the interlaced images and may allow, as illustrated in FIG. 12B, the observation of at least one periodic pattern of the revealed interlaced image. At least two of the blocks $B_1$ to $B_g$ allow the simultaneous observation of two different interlaced images, especially of two different periodic patterns. A change of the observation conditions may make it possible to observe successively the various interlaced images, and this may make it possible to give a motion effect when the interlaced images each represent the decomposition of a motion.

In the example of FIGS. 12A and 12B, the combined image I comprises four interlaced images $I_1$, $I_2$, $I_3$ and $I_4$ each representing a pattern $M_1$, $M_2$, $M_3$ and $M_4$, such as represented in FIG. 12A, which repeats periodically along the axis X and along the axes of the interlaced image lines $i_1$, $i_2$, $i_3$ and $i_4$. The combined image I therefore represents the pattern M, such as represented in FIG. 12A, which repeats periodically along the axis X and along the axes of the interlaced image lines $i_1$, $i_2$, $i_3$ and $i_4$. The interlaced image lines $i_1$, $i_2$, $i_3$ and $i_4$ are discontinuous. The revealing raster 4 of a rectangular shape comprises eight rectangular blocks $B_1$ to $B_8$, the blocks $B_1$, $B_2$, $B_3$ and $B_4$ being mutually phase-shifted and the block $B_1$ not being phase-shifted with respect to the block $B_8$, the block $B_2$ not being phase-shifted with respect to the block $B_5$, the block $B_3$ not being phase-shifted with respect to the block $B_6$ and the block $B_4$ not being phase-shifted with respect to the block $B_7$. Each of the blocks $B_1$ to $B_8$ makes it possible to reveal an interlaced image, the blocks $B_1$ to $B_8$ making it possible to each reveal one of the patterns $M_1$, $M_2$, $M_3$ and $M_4$.

As a variant, the combined image I illustrated in FIG. 37A comprises blocks $C_1$ to $C_3$ and the revealing raster 4 is in the form of a single block.

The blocks of the combined image are each such as described in conjunction with FIG. 1.

The combined-image blocks C1 to C3 are rectangular in shape. The blocks $C_1$ and $C_2$ are mutually phase-shifted by a width l of an interlaced image line and the blocks $C_1$ and $C_3$ are not mutually phase-shifted.

The revealing raster exhibits opaque raster lines 5*a* exhibiting a width m equal to the width l of a line $i_1$ to $i_3$ of interlaced images.

During the superposition of the revealing raster 4 and of the combined image I, such as illustrated in FIG. 37B, the revealed images $I_{r1}$ and $I_{r3}$ are composed of the totality of the red and blue lines and therefore exhibit a proportion (1; 0; 1) of the interlaced images and the revealed image $I_{r2}$ is composed of the totality of the red and green lines and exhibits a proportion (1; 1; 0) of the interlaced images.

By changing the observation conditions, especially by displacing the revealing raster with respect to the combined image in the direction X or by changing the angle of observation, the revealed images $I_{r1}$ to $I_{r3}$ change by passing for example from FIG. 37B to FIGS. 37C and 37D.

Observation by Superposition on Either Side of a Support

Figure 13:
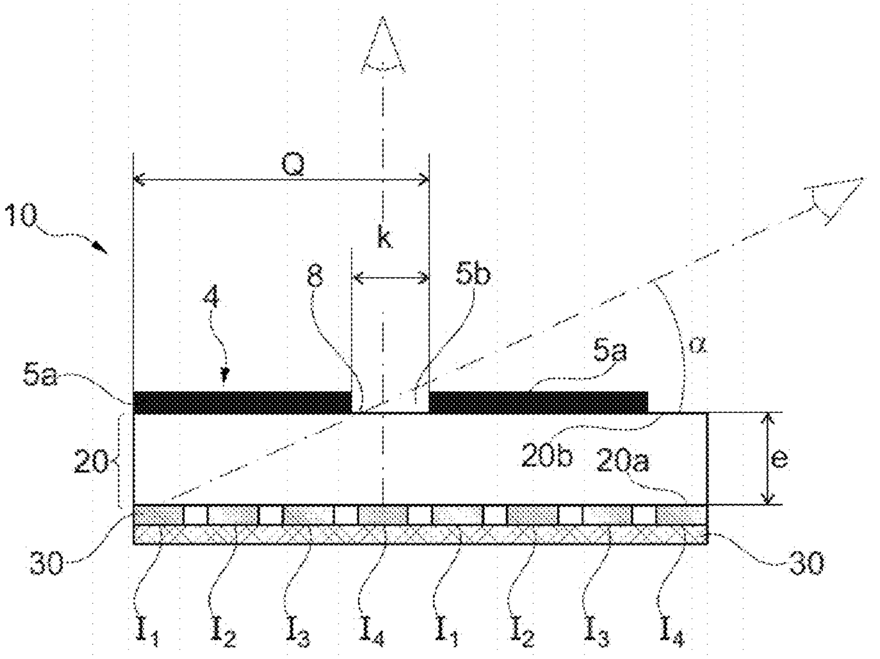

Represented in FIG. 13 is a first embodiment in which a secure item 10 according to the invention comprises a non-opaque, for example perfectly transparent, substrate 20 having a first face 20*a* carrying the combined image I. The second face 20*b* of the substrate 2, opposite to the first face, carries the revealing raster 4.

When the secure item 10 is observed from one side or from the other of the substrate, the revealing raster 4 makes it possible to observe one or more revealed images $I_r$. By changing the angle of observation α, the user changes the observation conditions and the revealed image or images $I_r$ are modified as described previously.

To be able to view all the interlaced images up to an angle of inclination of about 45°, the thickness e of the substrate is, preferably, greater than or equal to approximately the period Q.

It may be advantageous to have a substrate whose thickness e is less than or equal to 30 μm, better 25 μm, for example lying between 20 and 30 μm, or indeed 20 and 25 μm, bounds included or excluded.

Figure 14:
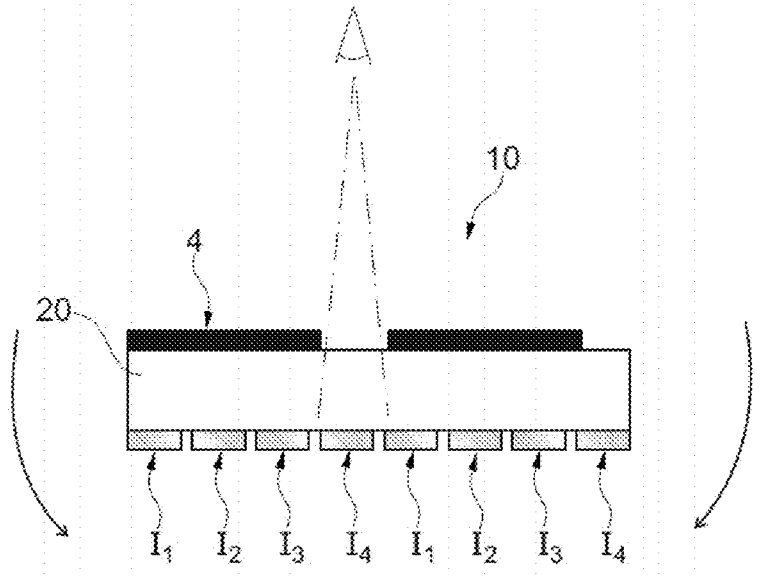

Another possibility for varying the direction of observation of the secure item may be to deform the substrate, for example around a fold axis, as illustrated in FIG. 14.

As a function of the pattern of the revealing raster 4, a tagging of the latter with respect to the combined image I may be necessary in the sense parallel to their general orientation. For example, for a linear revealing raster such as illustrated in FIG. 2, no tagging is necessary; on the other hand, for an undulated raster, a more or less precise tagging, as a function of the amplitude and of the frequency of the undulations, may turn out to be desirable. The invention thus offers a possibility of securing that can be modulated as a function of the protection sought and of the difficulty of implementation.

For secure items comprising a thread introduced as window(s), the combined image I may be obtained by microphotolithography of the thread and the revealing raster 4 may be produced with the help of offset printing with inks crosslinking under UV, performed subsequently when printing the item.

The revealing raster 4 may be associated, if relevant, with a printing pattern of the item.

The pattern of the revealing raster 4 may be printed otherwise than by superposition with the combined image I, on the item, to the same scale or to a different scale.

Figure 15:
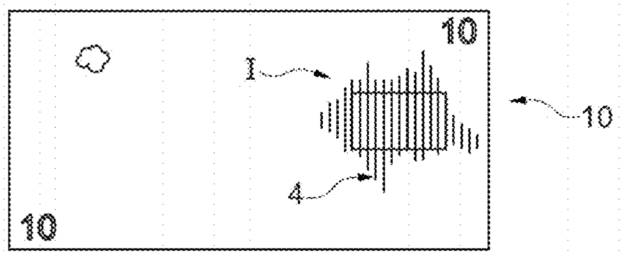

The printing of the revealing raster 4 may overrun the combined image I and extend over the secure item 10, as illustrated in FIG. 15.

Figure 16:
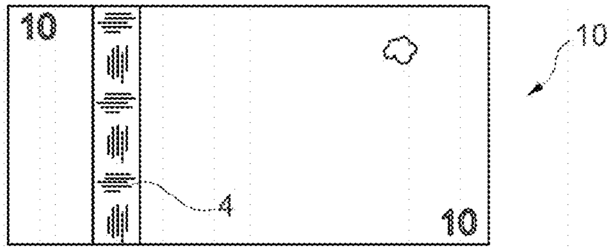

Several revealing rasters and combined images, having for example the form of small squares or rectangles with sides of a few millimeters, may be present in one and the same security thread 30, as illustrated in FIG. 16.

Figure 17A:
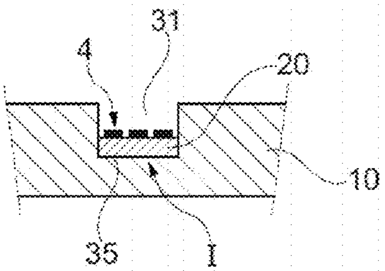
Figure 17B:
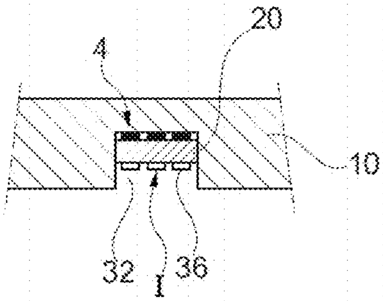

When the revealing raster 4 and the combined image I are on a thread integrated as window(s), as illustrated in FIGS. 17A and 17B, the secure item 10 may comprise at least two windows 31 and 32 making it possible to observe respectively each of the faces of the thread, in reflection.

The item may comprise at the level of the windows 31 and 32 material voids and transparent regions 35 and 36 allowing the observation of the revealed images from both sides of the secure item 10.

The interlaced images are observable through the revealing raster 4 from the window 31 side and with the revealing raster as background, from the window 32 side.

Figure 17C:
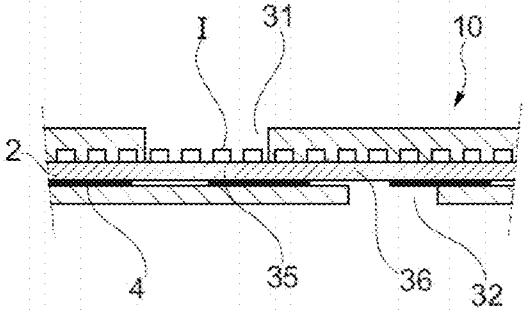
Figure 17D:
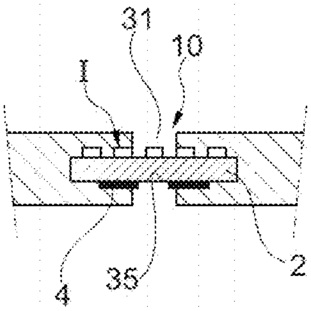

The item 10 may also comprise a through window 31, as represented in FIG. 17D, the revealing raster 4 and the combined image I being situated at least partially in this through window. In this way, it is possible to observe the revealed images at one and the same time from the recto side and from the verso side of the secure item 10.

The revealing raster 4 and the combined image in the form of a security thread may further be incorporated into a secure item 10 which exhibit an alternation of windows 31 and 32 recto side and verso side, as illustrated in FIG. 17C. It is thus possible to observe the revealed images at one and the same time on the recto side and on the verso side of the secure item 10 at the level of the windows 31 and 32, and especially on account of the presence of the material voids and the transparent regions 35 and 36.

Figure 18:
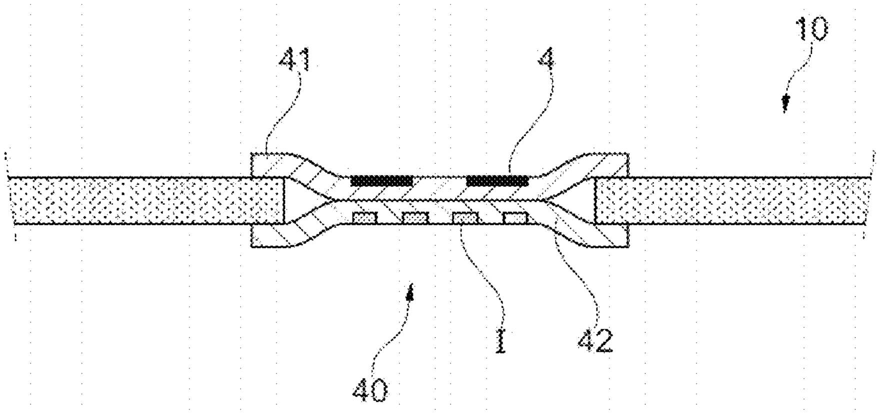

Represented in FIG. 18 is an exemplary secure item 10 comprising a perforation 40 in which two sub-elements, especially in the form of foils or patches, 41 and 42, are at least partially placed.

The sub-element 41 comprises for example a revealing raster 4 and the sub-element 42 comprises for example the corresponding combined image I.

The sub-elements 41 and 42 may be at least partially superposed on the boundaries of the perforation 40 with or without a thickness compensation.

The sub-elements 41 and 42 may be at least partially transparent or translucent.

The observation of the revealed images may be done by observation in reflection or in transmission, for example with the aid of a light source situated behind the item 10 during observation.

Figure 19:
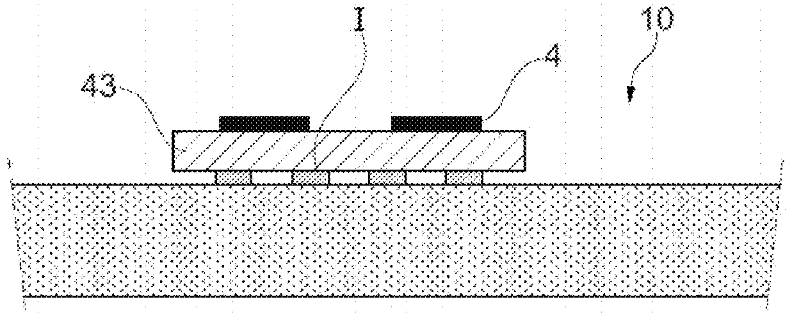

In the variant illustrated in FIG. 19, the secure item 10 comprises a combined image I produced in the form of prints. The prints are for example produced on the surface of the secure item 10. Moreover, a sub-element 43, especially in the form of a foil or patch, is placed on the prints constituting the combined image I, the sub-element 43 comprising the corresponding revealing raster 4, for example produced on the surface of the sub-element 43.

The secure item 10 may or may not be opaque. The secure item 10 may be at least partially transparent or translucent to allow observation of the interlaced images, especially on the combined image I side.

In the examples of FIGS. 18 and 19, the revealing rasters 4 and/or the combined images I could be produced differently, being for example incorporated or situated above or below the sub-elements 41, 42 and 43.

As a variant, the combined image comprises two metallizations of various colors, each corresponding to an interlaced image, especially a copper interlaced image and an aluminum interlaced image.

As a further variant, the combined image comprises at least two metallizations, especially of the same color, of various optical densities and each corresponding to an interlaced image, thus creating a glossiness contrast.

The aluminum interlaced image may be of high optical density, thereby giving it a glossy aspect.

The revealing raster 4 may be of matt aspect.

Superposition of the combined image I and of the revealing raster 4 makes it possible to obtain according to the blocks $B_1$ to $B_g$, matt or glossy revealed images $I_{r1}$ to $I_{rg}$. A displacement of the revealing raster 4 with respect to the combined image I along the axis X may make it possible to invert the aspect of the revealed images $I_{r1}$ to $I_{rg}$ at the level of the various blocks $B_1$ to $B_g$, that is to say that the revealed images $I_{r1}$ to $I_{rg}$ which were glossy may become matt and vice versa.

Figure 20:
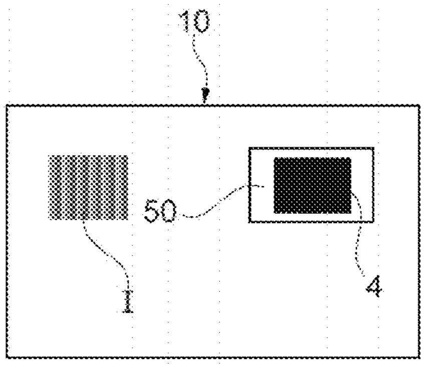

Observation by Folding the Document or Superposing the Document and Another Object In a second embodiment, illustrated in FIG. 20, the secure item 10 comprises a window 50, preferably at least partially transparent, in which the revealing raster 4 is featured. The item 10 also comprises a combined image I carried on the item 10, for example by printing, especially copper-plate printing, offset printing or metallization and/or demetallization. The region in which the combined image 2 is featured may also be at least partially transparent.

Figure 21:
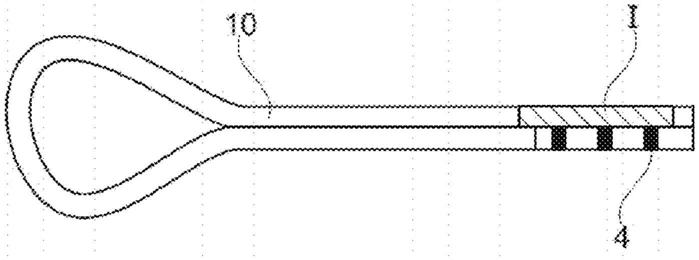

To observe the revealed image, the user must therefore fold the secure item 10, as illustrated in FIG. 21, to bring the revealing raster 4 onto the combined image I so that their general orientation is the same and then observe the revealed image or images $I_r$. Thus, the revealed images are not visible when the item 10 is not folded and an action by the user, namely folding the secure item 10, is necessary in order to make them appear.

Figure 22:
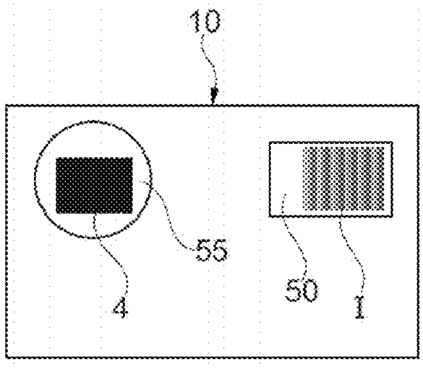

In FIG. 22, the secure item 10 comprises a window 50, preferably at least partially transparent, in which the combined image I is featured. The item 10 also comprises a patch 55 comprising for example holographic prints and in which the revealing raster 3 is featured. The patch 55 may also be at least partially transparent.

The patch 55 may comprise metallizations and/or demetallizations, made for example of aluminum, and the revealing raster 4 may comprise holographic prints and/or metallizations and/or demetallizations.

Figure 23:
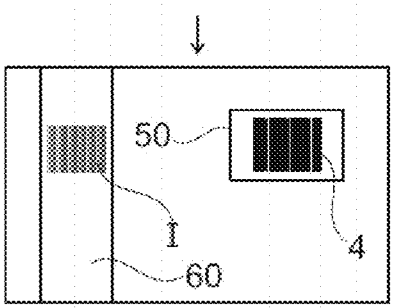

In FIG. 23, the item 10 comprises a window 50, preferably at least partially transparent, on which the revealing raster 4 is featured. The item 10 also comprises a security thread 60 on which the combined image I is featured. The security thread 60 may also be at least partially transparent or comprise a partially transparent region at the level of the combined image I.

Represented in FIGS. 24 to 28 are other examples of secure items 10 according to the invention comprising a combined image I and a revealing raster 4 in accordance with those of FIGS. 20 to 22, the combined image I and/or the revealing raster 4 being carried by at least one security thread or foil.

Figure 24:
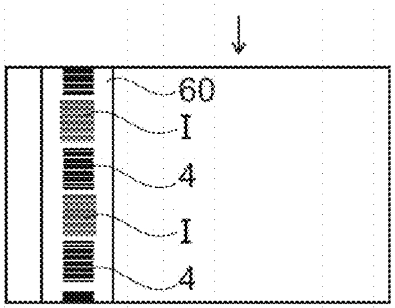

In FIG. 24, the item 10 comprises a security thread 60 of a sufficient width to cause combined images I and revealing rasters 4 to be featured in alternation. Advantageously, the security thread 60 is at least partially transparent or exhibits one or more at least partially transparent regions at the level of the combined images I and/or of the revealing rasters 4.

Figure 25:
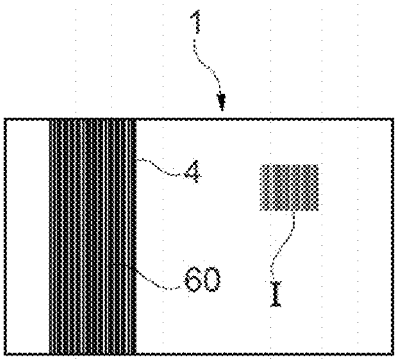

In FIG. 25, the item 10 comprises a security thread 60 on which a revealing raster 4 is featured. The item 10 also comprises a combined image I, for example in the form of an offset print on the item 10.

The security thread 60 may be at least partially transparent or exhibit an at least partially transparent region. The item 10 may also comprise an at least partially transparent region at the level of the combined image I.

Figure 26:
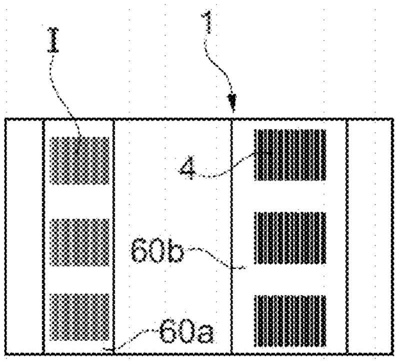

In FIG. 26, the item 10 comprises two security threads 60*a* and 60*b*. The security thread 60*a* comprises three combined images I and the security thread 60*b* comprises three revealing rasters 4.

The security thread 60*a* and/or the security thread 60*b* may be at least partially transparent or comprise at least one at least partially transparent region, especially at the level of a combined image I or of a revealing raster 4.

Figure 27:
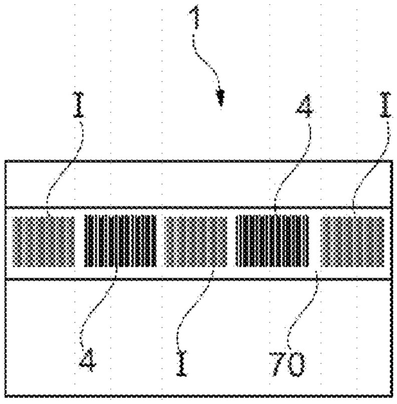

In FIG. 27, the item 10 comprises a foil 70 on which an alternation of combined images I and of revealing rasters 4 is featured.

The foil 70 may be at least partially transparent or comprise at least one at least partially transparent region at the level of a combined image I and/or of a revealing raster 4.

Figure 28:
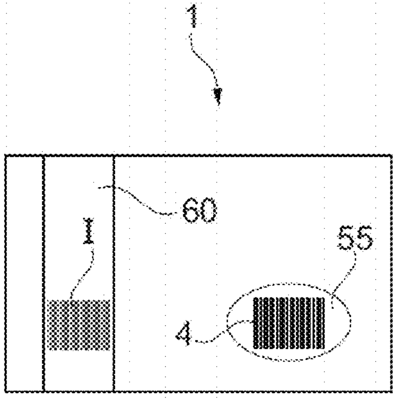

In FIG. 28, the item 10 comprises a security thread 60 on which a combined image I is featured. The item 10 also comprises a patch 55, able to comprise holographic metallizations or otherwise, on which a revealing raster 4 is featured.

The security thread 60 may be at least partially transparent or comprise an at least partially transparent region at the level of the combined image I.

The patch 55 may also be at least partially transparent, especially at the level of the revealing raster 4.

In all the examples described previously, the combined images I and the revealing rasters 4 may be swapped.

The at least partially transparent regions may be situated at the level of the combined images I or of the revelation means 4, or at the level of both at one time.

The security thread or threads 60, 60$a$ and 60$b$ may be introduced into the secure item 10 in a conventional manner, for example at the surface, bulk-wise or as window(s).

The authentication of the items 10 may be done by folding them 10 lengthways or widthways so as to at least partially superpose the combined images I and the revealing rasters 4, and then by displacing relative to one another so as to view for example the illusion of a motion and/or by modifying the angle of observation of the combined images I and of the revealing rasters 4 superposed.

As a further variant, it is also possible to superpose the item 10 at least partially with another similar item, such as described previously.

Two Revealing Rasters Exhibiting Blocks

As illustrated in FIGS. 29A to 29F, the item or the assembly may comprise two revealing rasters 4$a$ and 4$b$ such as described previously, superposed with the same combined image I.

The two revealing rasters are, preferably, of different general orientations $O_{ta}$ and $O_{tb}$ forming between them a non-zero angle β, preferably lying between 0° and 180° bounds excluded, better between 10 and 30°, for example here substantially equal to 20°.

The fact that the revealing rasters have different general orientations allows at given observation conditions that:

- when the combined image I is oriented with the general orientation $O_{ta}$, the revealed images $I_{r1a}$ to $I_{rga}$ of the first revealing raster 4$a$ at the level of the blocks $B_{1a}$ to $B_{ga}$ are visible and the revealed images $I_{r1b}$ to $I_{rub}$ of the second revealing raster 4$b$ at the level of the blocks $B_{1b}$ to $B_{ub}$ are not visible on account of the presence of a Moiré phenomenon, and
- when the combined image I is oriented with the general orientation $O_{ta}$, the revealed images $I_{r1b}$ to $I_{rub}$ of the second revealing raster 4$b$ are visible and the revealed images $I_{r1a}$ to $I_{rga}$ of the first revealing raster 4$a$ are not visible on account of the presence of a Moiré phenomenon.

Thus, according to the orientation of the combined image I with respect to the revealing rasters 4$a$ and 4$b$, one or the other or none of the revealed images is visible, thereby affording the possibility of increased security.

To observe the images revealed by one or the other of the rasters, the user must therefore superpose the combined image I and the revealing rasters 4$a$ and 4$b$ by folding the item 10 or superposing the item 10 and another object and rotate the combined image I with respect to the revealing rasters 4$a$ and 4$b$. The user may also displace them with respect to one another along an axis X perpendicular to the general orientation of the combined image to observe a change of the revealed image or images of one of the rasters.

The two revealing rasters 4$a$ and 4$b$ may or may not be separated from one another. Preferably, the revealing raster 4$b$ is an inclusion in the revealing raster 4$a$.

In the example illustrated in FIG. 29B, the first revealing raster 4$a$ is of square shape and is formed of 17 blocks $B_{1a}$ to $B_{17a}$, in particular a central block $B_{1a}$ of substantially square shape framed by 16 lateral blocks $B_{2a}$ to $B_{17a}$ likewise of square shape. 12 lateral blocks $B_{2a}$ to $B_{13a}$ are juxtaposed all around the central block $B_{1a}$ to form a square of width equal to twice the width of the central block $B_{1a}$ and 4 lateral blocks $B_{14a}$ to $B_{17a}$ are each totally superposed with two of the 12 lateral blocks $B_{2a}$ to $B_{13a}$ respectively with the blocks $B_{3a}$ and $B_{4a}$, $B_{6a}$ and $B_{7a}$, $B_{9a}$ and $B_{10a}$, and $B_{12a}$ and $B_{13a}$. The blocks $B_{1a}$ to $B_{17a}$ are all of substantially square shape. The lateral blocks $B_{2a}$ to $B_{17a}$ are of width substantially equal to half the width of the central block $B_{1a}$. Superposition of the lateral blocks $B_{14a}$ to $B_{17a}$ with the other lateral blocks $B_{2a}$ to $B_{13a}$ allows the formation of 8 sub-blocks such as described previously. Each lateral block $B_{2a}$, to $B_{13a}$ is phase-shifted with respect to the lateral block $B_{2a}$ to $B_{13a}$ which precedes it and which follows it. The lateral blocks $B_{2a}$, $B_{5a}$, $B_{8a}$, and $B_{11a}$ forming the corners of the revealing raster 4 are not mutually phase-shifted and are not phase-shifted with respect to the central block $B_{1a}$.

The second revealing raster 4$b$ is of rectangular shape and it is formed of 4 blocks $B_{1b}$ to $B_{4b}$ of various shapes. The block $B_{2b}$ represents the digit 1, the blocks $B_{3b}$ and $B_{4b}$ represent the digit 0 and the block $B_{1b}$ is a rectangular block in which the other blocks are inserted. The blocks $B_{2b}$ to $B_{4b}$ are not mutually phase-shifted but are phase-shifted with respect to the block $B_{1b}$.

The two revealing rasters 4$a$ and 4$b$ have different respective general orientations $O_{ta}$, and $O_{tb}$ and form between them an angle β substantially equal to 20°.

The opaque raster lines 5$a$ have a width m substantially equal to three-quarters of the width l of the interlaced image lines just as in the example of FIGS. 6A to 6D.

The revealing rasters 4$a$ and 4$b$ are superposed with the same combined image I, illustrated in FIG. 29A.

As visible in FIGS. 29C and 29D, when the combined image is oriented in the same direction as the first revealing raster 4$a$, the blocks $B_{1a}$ to $B_{17a}$ cause revealed images $I_{r1a}$ to $I_{r21a}$ to appear, forming a central square $I_{r1a}$ surrounded by smaller squares $I_{r2a}$ to $I_{r21a}$ of various colors. The color of the small squares $I_{r2a}$, $I_{r5a}$, $I_{r8a}$ and $I_{r11a}$ in the corners is the same as that of the central square $I_{r1a}$. The second revealing raster 4$b$ does not form any visible image on account of a Moiré phenomenon between the lines of the second revealing raster 4$b$ and the lines of the combined image I.

FIGS. 29C and 29D represent images revealed under different observation conditions but still with the same orientation of the revealing rasters 4$a$ and 4$b$ and of the combined image. The color of the revealed images changes.

As visible in FIGS. 29F and 29G, when the combined image is oriented in the same direction as the second revealing raster 4$b$, the revealed images $I_{r1b}$ to $I_{r4b}$ form the number 100 on a colored background, the colors of all the digits being identical. The first revealing raster 4$a$ does not form any visible image on account of a Moiré phenomenon between the lines of the first revealing raster 4$a$ and those of the combined image I.

FIGS. 29D and 29G represent images revealed under different observation conditions from those of the respective FIGS. 29C and 29F but respectively still with the same orientation of the revealing rasters 4$a$ and 4$b$ and of the combined image. The color of the revealed images changes.

As illustrated in FIG. 29E, the superposition of the revealing raster 4 and of the combined image I may be done by folding the secure item 10 and the change of orientation may be done by rotating the part of the secure item 10$a$ carrying the combined image I with respect to the part of the secure item 10$b$ carrying the revealing raster 4.

Imager

Represented in FIGS. 30 to 32 are examples of association between a secure item 10 and an electronic imager 100 making it possible to form the revealing raster 4 or the combined image I.

In FIG. 30, the electronic imager 100 is for example a computer screen on which a first image 110 is displayed, the first image 110 being the revealing raster 4 or the combined image I.

The secure item 10 is for example in the form of a banknote and comprises a second image 120, the second image being the revealing raster 4 if the first image is the combined image and vice versa.

The secure item 10 is placed on the screen of the electronic imager 100 in such a way as to superpose the first image 110 at least partially with the second image 120 so as to observe the revealed image or images $I_r$, and deduce therefrom an authentication and/or identification piece of information in respect of the secure item 10.

The secure item 10 may be displaced relative to the screen of the electronic imager 100 or the observer may change angle of observation to allow the observation of a change of the revealed image or images $I_r$.

As a variant, the secure item 10 remains immobile with respect to the screen of the electronic imager 100 and the first image 110 is animated with a motion on the screen, for example a translation, for example with the aid of a program activated or not by the user.

In FIG. 31, the electronic imager 100 is for example in the form of a digital projector, projecting a first image 110 onto a background 150, for example the wall of a room.

The secure item 10 comprising the second image 120 may then be at least partially superposed with the first image 110 projected onto the background 150 to allow observation of the revealed image or images $I_r$.

In FIG. 32, the electronic imager 100 is a projector which projects the first image 110 directly on the secure item 10.

The first image 110 may, as in the example of FIG. 32, be projected, for example in the form of a "W", on a region of the secure item 10 where the second image 120 is not present. Next, the secure item 10 is for example folded on itself in such a way as to superpose the second image 120, for example in the form of an "A", with the first image 110 projected by the electronic imager 100. The part of the secure item 10 comprising the second image 120 may in particular be folded down onto the part comprising the first image 110, this part remaining immobile, in such a way that the first image 110 is situated between the imager 100 and the second image 120.

In a variant, not represented, the first image 110 is projected directly on the second image 120 of the item 10. In particular, the projection of the first image 110 on the second image 120 of the item 10 may allow an at least partial superposition of the first and second images. Next, the electronic imager 100 may be displaced relative to the item 10 so as to displace the revealing raster 4 with respect to the combined image I.

Represented in FIG. 33 is a variant embodiment in which the electronic imager 100 is a screen displaying several first images 110*a*, 110*b*, 110*c* and 110*d*.

The first images 110*a* to 110*d* may have different properties, for example different shapes, colors, dimensions, raster elements.

Advantageously, the first images 110*a* to 110*d* are differentiated in such a way as to allow one of them at least to be associated with at least one second image 120 present on an item 10. In this way, it is for example possible to authenticate and/or identify a greater diversity of items 10 having different respective second images, corresponding to the various first images 110*a* to 110*d*.

As a variant, the item 10 comprises several different second images 120, as may be seen for example in FIG. 16, and the electronic imager 100 produces one or more first images 110. In this way, it is possible to authenticate and/or to identify a given security item 1 on a greater diversity of different electronic imagers, and especially with electronic imagers having different resolutions. In this way, the two aforementioned advantages may be brought together.

The electronic imager 100 may display one or more indicators 140*a*, 140*b*, 140*c* and 140*d* making it possible to advise the user on the way to position the item 10 represented in FIG. 34 with respect to the imager.

In particular, the indicators 140*a* to 140*d* may make it possible to know where to position the top right corner of the item 10, so as to correctly superpose a second image 120 of an item 10 with a first image 110*a*, 110*b*, 110*c* or 110*d* displayed on the screen of the electronic imager 100.

The item 10 may comprise an integrated microcircuit 152, for example an RFID or optical chip, making it possible to communicate with the electronic imager 100 so as to control the display of an indicator such as described previously or to disseminate a piece of information on the way to position the first and second images.

As a variant, the chip 152 is able to communicate with the electronic imager 100 so as to make it possible to produce the first image 110 associated with the second image 120.

In particular, during the method for authenticating and/or identifying the item 10, the second image 120 is illuminated with the electronic imager 100. The chip 152 comprises a piece of information transmitted to the electronic imager 100 which then projects or displays the first image 110 as a function of this piece of information.

The item 10, especially the second image 120, may be photographed and/or filmed by a digital camera belonging or linked to the electronic imager 100. A recognition program may then make it possible to recognize the second image 120 and to acquire from a database a first image 110 associated with the second image 120. The database is for example stored on a secure server. The first image 110 thus obtained is displayed and/or projected by the electronic imager 110 so as to make it possible to authenticate and/or to identify the item 10.

In the variant illustrated in FIG. 35, the electronic imager 100 takes the form of a mobile telephone on which is displayed a first image 110 in the form of a combined image I. The item 10 comprises a polarizing filter on which the second image 120 has been formed in the form of a revealing raster 4. The item 10 comprising the second image 120 in the form of a revealing raster 4 is superposed with the first image 110 in the form of a combined image I produced by the electronic imager 100, the latter emitting polarized light.

The item 10 comprising the revealing raster 4 may be displaced by a translation motion along the axis X with respect to the combined image I displayed by the screen of the electronic imager 100, in such a way as to change the revealed image or images $I_r$.

Such a method makes it possible to authenticate and/or to identify the security item 1 according to several security levels.

The positioning of the revealing raster 4 comprising the polarizing filter according to the orientation making it possible to observe the opacity of the polarizing filter, this observation being visible only on a screen emitting a polarized light, for example a screen of the LCD type, affords a first level of security.

The revealing of the animation of the revealed images by displacement of the revealing raster 4 relative to the combined image I affords a second level of security.

As a further variant, the electronic imager 100 is a screen, especially of the LCD type, comprising a plurality of pixels preferably forming a combined image, for example such as described in FIG. 36A.

The invention is not limited to the examples illustrated. The secure item may be produced with other securities of first, second or third level, for example.

The expression "comprising a" should be understood as being synonymous with "comprising at least one".

The invention claimed is:

1. A secure item comprising a first optical structure and a second optical structure, or assembly comprising a secure item and another object, the secure item comprising one of the first optical structure and of the second optical structure and the object comprising or forming the other of the first optical structure and of the second optical structure, the first optical structure comprising at least two blocks of first optical structure arranged in different regions of the first optical structure and the second optical structure comprising a single block of second optical structure, a.) the first optical structure being a revealing raster, the blocks of revealing raster each comprising a periodic alternation of occulting raster elements and of non-occulting raster elements in one or more directions and being of the same period in the or in each of the directions, the at least two blocks of first optical structure comprising raster elements of different dimensions according to the or to at least one of the directions, or raster elements that are mutually phase-shifted along an axis perpendicular to the or to one of the directions by a distance $d_{ij}$ which is less than the period in this direction of the blocks of first optical structure, the distance $d_{ij}$ being the remainder of the division of the distance $c_{ij}$ between the axis of an occulting element of one of the two raster blocks and the axis of an occulting element of one of the other of the two raster blocks, by the period of the revealing raster the second optical structure being the combined image being composed of a plurality of interlaced images, the combined image comprising a periodic alternation of elements of interlaced images in one or more directions, or b.) the first optical structure being a combined image, the blocks of combined image being each composed of a plurality of interlaced images, each blocks of combined image comprising a periodic alternation of elements of interlaced images in one or more directions and being of the same period in the or in each of the directions, the at least two blocks of the first optical structure comprising elements of corresponding combined images of different dimensions according to the or to at least one of the directions, or combined-image elements that are mutually phase-shifted along an axis perpendicular to the or to one of their directions by a distance $d_{ij}$ which is less than the period in this direction of the blocks of first optical structure, the distance $d_{ij}$ being the remainder of the division of the distance $c_{ij}$ between the axis of an element of interlaced images of one of the two combined-image blocks and the axis of an interlaced-image element of the same interlaced image of the other of the two combined-image blocks, by the period of the combined image, the second optical structure being the revealing raster comprising a periodic alternation of occulting raster elements and of non-occulting raster elements in one or more directions, the elements of the interlaced images of one and the same interlaced image being of the same color but of a different color from that of the other interlaced images, at least two blocks of first optical structure each allowing, when the revealing raster and the combined image are superposed, such that the revealing raster and the combined image have the same one or more direction, at a given position and orientation of the revealing raster with respect to the combined image and at a given angle of observation α, the observation of a revealed image at the level of each block of first optical structure, the revealed images at the level of the two blocks of first optical structure unveiling different proportions of the interlaced images, the period of the combined image or of each of the blocks of the combined images in the or one of the directions being equal to the period in this direction of the revealing raster or of each of the blocks of revealing raster and the elements of interlaced images and the raster elements being of the same general shape.

2. The item or assembly as claimed in claim 1, the elements of interlaced images being interlaced image lines of mutually parallel longitudinal axes.

3. The item or assembly as claimed in claim 1, the first optical structure being the revealing raster, the at least two blocks of the revealing raster being arranged in regions of the revealing raster that are partially superposed and defining a sub-block exhibiting a periodic alternation in the or in a direction of two different aspect raster elements, the occulting raster element having a dimension in this direction that is greater than or equal to that of each of the superposed blocks, and/or a periodic alternation in the or in a direction of four raster elements, the raster elements of the two blocks being mutually interleaved, each raster element exhibiting a different aspect from the directly adjacent raster elements.

4. The item or assembly as claimed in claim 1, the at least two blocks of the first optical structure being arranged in distinct regions of the first optical structure.

5. The item or assembly as claimed in claim 1, the combined image exhibiting a resolution of greater than or equal to 800 dpi.

6. The item or assembly as claimed in claim 1, the revealed images exhibiting an aspect, especially a color, which is homogeneous to the naked eye and at a normal observation distance.

7. The item or assembly as claimed in claim 1, the at least two blocks each allowing, when the revealing raster and the combined image are superposed, at a given position and orientation of the revealing raster with respect to the combined image and at a given angle of observation α, the observation of revealed images consisting of two adjacent interlaced images, the revealed images comprising at least one different interlaced image.

8. The item or assembly as claimed in claim 1, the at least two blocks each allowing, when the revealing raster and the combined image are superposed, at a given position and orientation of the revealing raster with respect to the combined image and at a given angle of observation α, the observation of an interlaced image.

9. The item or assembly as claimed in claim 1, the revealed images forming a macropattern when the revealing raster is superposed with the combined image, at a given position and orientation of the revealing raster with respect to the combined image and at a given angle of observation α.

10. The item or assembly as claimed in claim 1, the combined image and/or the revealing raster comprising metallizations and/or demetallizations.

11. The item or assembly as claimed in claim 1, the revealed images being visible by observation under reflected light and/or under transmitted light.

12. The item or assembly as claimed in claim 1, one at least of the combined image and of the revealing raster featuring on a region of the secure item or of the at least partially transparent object, the superposition of the revealing raster and of the combined image being performed by folding of the secure item or by superposition of the secure item with the other object.

13. The item or assembly as claimed in claim 1, the revealing raster and the combined image being superposed by being separated from one another by a gap of constant thickness.

14. The item or assembly as claimed in claim 1, the other object being an electronic imager making it possible to form a first image, the first image being the revealing raster or the combined image, so as to be able to superpose it with a second image of the secure item, the second image being the other of the revealing raster and of the combined image.

15. A secure item or assembly as claimed in claim 1 comprising two first optical structures on the secure item or on the object, the first optical structures being revealing rasters and the second optical structure being a combined image or the two first optical structures being combined images and the second optical structure being a revealing raster, when the two first optical structure and the second optical structure are superposed, at a position of the two first optical structure with respect to the second given optical structure and at a given angle of observation $\alpha$, at least two blocks of one of the first optical structure or of the second optical structure each allowing, at a first orientation of said one of the first optical structures with respect to the second optical structure, such that the blocks of said one of the first optical structures and the combined image have the same one or more direction, the observation of a first revealed image at the level of each block of said one of the first optical structures, the first revealed images at the level of the two blocks of said one of the first optical structures or of the second optical structure unveiling different proportions of the interlaced images, at least two blocks of the other of the first optical structures each allowing, at a second orientation of said one of the first optical structures with respect to the second optical structure, such that the blocks of said other of the first optical structures and the combined image have the same one or more directions, the observation of a second revealed image at the level of each block of said other of the first optical structures or of the second optical structure, the second revealed images at the level of the two blocks of said other of the first optical structure or of the second optical structure unveiling different proportions of the interlaced images, the first and the second orientation being different.

16. A method for authenticating a secure item as claimed in claim 1, in which one observes the revealed images by the blocks of the first optical structure(s) and one concludes at least on the basis of this observation as to the authenticity of the item.

17. The item or assembly as claimed in claim 2, the elements belonging to different interlaced images being different by their aspects, especially their hues, opacities, saturations, luminescences, or brightnesses.

18. The item or assembly as claimed in claim 2, the interlaced-image lines being of dimension in the or each of the directions which is less than or equal to 1 mm.

19. The item or assembly as claimed in claim 4, the at least two blocks exhibiting a part of their contours in common.

20. The item or assembly as claimed in claim 9, the macropattern changing aspect upon a change of the position of the revealing raster with respect to the combined image and/or a change of the angle of observation $\alpha$.

21. The item or assembly as claimed in claim 9, the macropattern disappearing upon a change of the orientation of the revealing raster with respect to the combined image.

22. The item or assembly as claimed in claim 12, each block making it possible when superposed at least partially with the combined image of the same secure item or of the other object to observe different revealed images by a relative displacement of the revealing raster with respect to the combined image.

23. The item or assembly as claimed in claim 13, each block making it possible to observe different revealed images upon a change of the angle of observation a of the security document.

24. The item or assembly as claimed in claim 15, the first revealed images forming a first pattern in the first orientation and the second revealed images forming a second pattern in the second orientation, the first pattern not being visible in the second orientation and the second pattern not being visible in the first orientation.

25. The authentication method as claimed in claim 16, in which the angle of observation and/or the position of the revealing raster or rasters with respect to the combined image is changed so as to observe a change of the revealed image for each block of the first optical structure(s).

26. Item or assembly, as claimed in claim 17, the elements belonging to different interlaced images being of different hues.

* * * * *